US010788856B2

(12) United States Patent
Peil et al.

(10) Patent No.: US 10,788,856 B2
(45) Date of Patent: Sep. 29, 2020

(54) DOCKING STATION

(71) Applicant: Intel Corporation, Santa Clara, CA (US)

(72) Inventors: Brian R. Peil, Portland, OR (US); Russell S. Aoki, Tacoma, WA (US); Aleksander Magi, Aloha, OR (US); James W. Edwards, Portland, OR (US); Don J. Nguyen, Portland, OR (US); Nicholas W. Oakley, Portland, OR (US); Daria A. Loi, Portland, OR (US); Meenakshi Gupta, Portland, OR (US); Nithyananda S. Jeganathan, Portland, OR (US)

(73) Assignee: Intel Corporation, Santa Clara, CA (US)

(*) Notice: Subject to any disclaimer, the term of this patent is extended or adjusted under 35 U.S.C. 154(b) by 134 days.

(21) Appl. No.: 15/770,984

(22) PCT Filed: Nov. 24, 2015

(86) PCT No.: PCT/US2015/062235
§ 371 (c)(1),
(2) Date: Apr. 25, 2018

(87) PCT Pub. No.: WO2017/091201
PCT Pub. Date: Jun. 1, 2017

(65) Prior Publication Data
US 2018/0307275 A1   Oct. 25, 2018

(51) Int. Cl.
*G06F 1/16* (2006.01)
*H05K 5/00* (2006.01)
*H05K 7/00* (2006.01)
*H02J 50/80* (2016.01)
*H02J 7/00* (2006.01)
*H02J 7/02* (2016.01)

(52) U.S. Cl.
CPC .......... *G06F 1/1632* (2013.01); *H02J 7/0027* (2013.01); *H02J 7/0044* (2013.01); *H02J 7/025* (2013.01); *H02J 50/80* (2016.02)

(58) Field of Classification Search
CPC ....... G06F 1/1632; H02J 50/80; H02J 7/0027; H02J 7/0044; H02J 7/025
USPC ........................................ 361/679.4–679.45
See application file for complete search history.

(56) References Cited

U.S. PATENT DOCUMENTS

| 5,864,708 A * | 1/1999 | Croft ..................... G06F 1/1632 370/521 |
| 2005/0052156 A1 | 3/2005 | Liebenow |
| 2007/0035917 A1* | 2/2007 | Hotelling .............. G06F 1/1632 361/679.56 |

(Continued)

OTHER PUBLICATIONS

International Search Report and Written Opinion issued in PCT Application No. PCT/US2015/062235 dated Aug. 10, 2016; 10 pages.

*Primary Examiner* — Anthony M Haughton
(74) *Attorney, Agent, or Firm* — Patent Capital Group

(57) ABSTRACT

Particular embodiments described herein provide for an electronic system that includes a docking station configured to wirelessly couple to an electronic device and a wireless charging element removably coupled to the docking station. The wireless charging element includes a power receiving unit and is configured to wireless charge the electronic device. In an example, the docking station is configured for high speed input/output.

17 Claims, 40 Drawing Sheets

(56) References Cited

U.S. PATENT DOCUMENTS

| | | | |
|---|---|---|---|
| 2008/0258679 A1* | 10/2008 | Manico | H02J 50/10 |
| | | | 320/106 |
| 2009/0177908 A1 | 7/2009 | Baarman et al. | |
| 2010/0145236 A1 | 6/2010 | Greenberg et al. | |
| 2013/0031377 A1 | 1/2013 | Sultenfuss et al. | |
| 2013/0236192 A1* | 9/2013 | Deicke | G06F 1/26 |
| | | | 398/135 |
| 2014/0021909 A1* | 1/2014 | Klawon | G06F 1/1632 |
| | | | 320/108 |
| 2014/0036437 A1* | 2/2014 | Supran | G06F 1/1632 |
| | | | 361/679.41 |
| 2014/0059263 A1* | 2/2014 | Rosenberg | G06F 1/1632 |
| | | | 710/303 |
| 2016/0320867 A1* | 11/2016 | Chan | H02J 7/0054 |
| 2017/0063102 A1* | 3/2017 | Sultenfuss | H02J 5/005 |
| 2017/0090516 A1* | 3/2017 | Ku | G06F 1/1671 |
| 2018/0107253 A1* | 4/2018 | Landwehr | G06F 1/1681 |

* cited by examiner

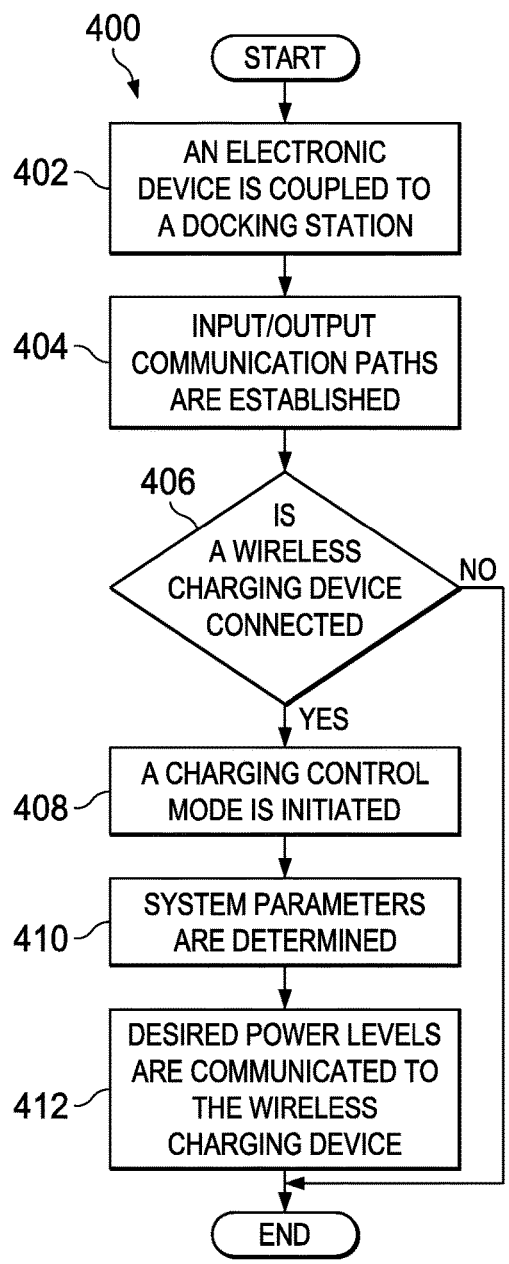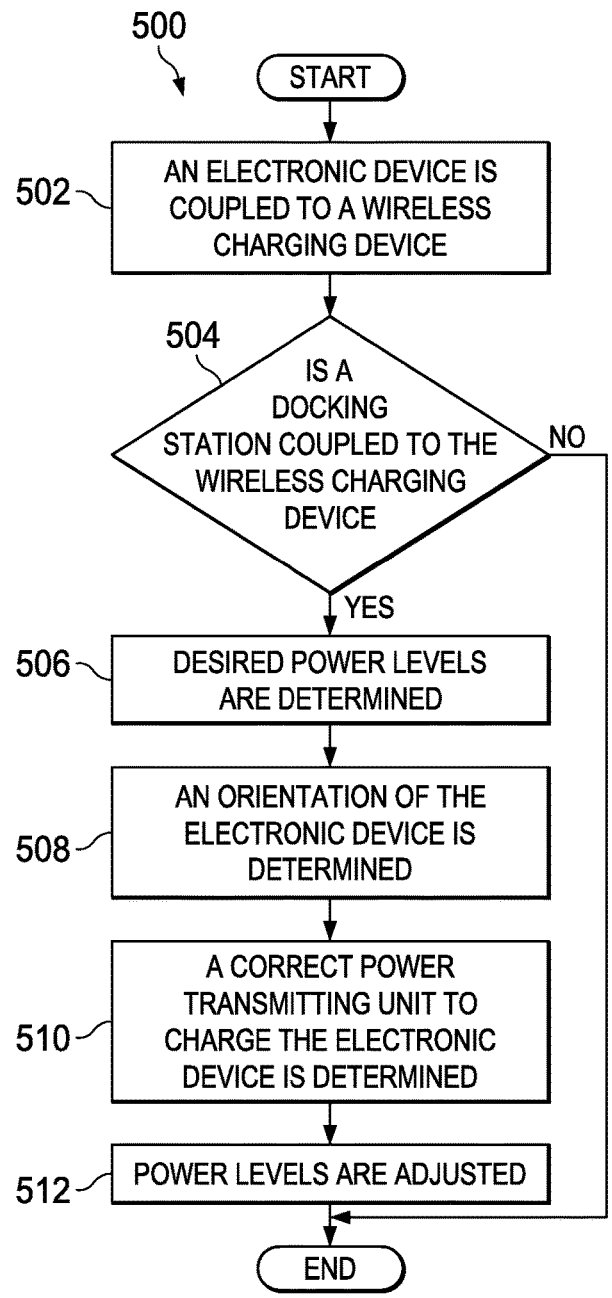
FIG. 4
FIG. 5

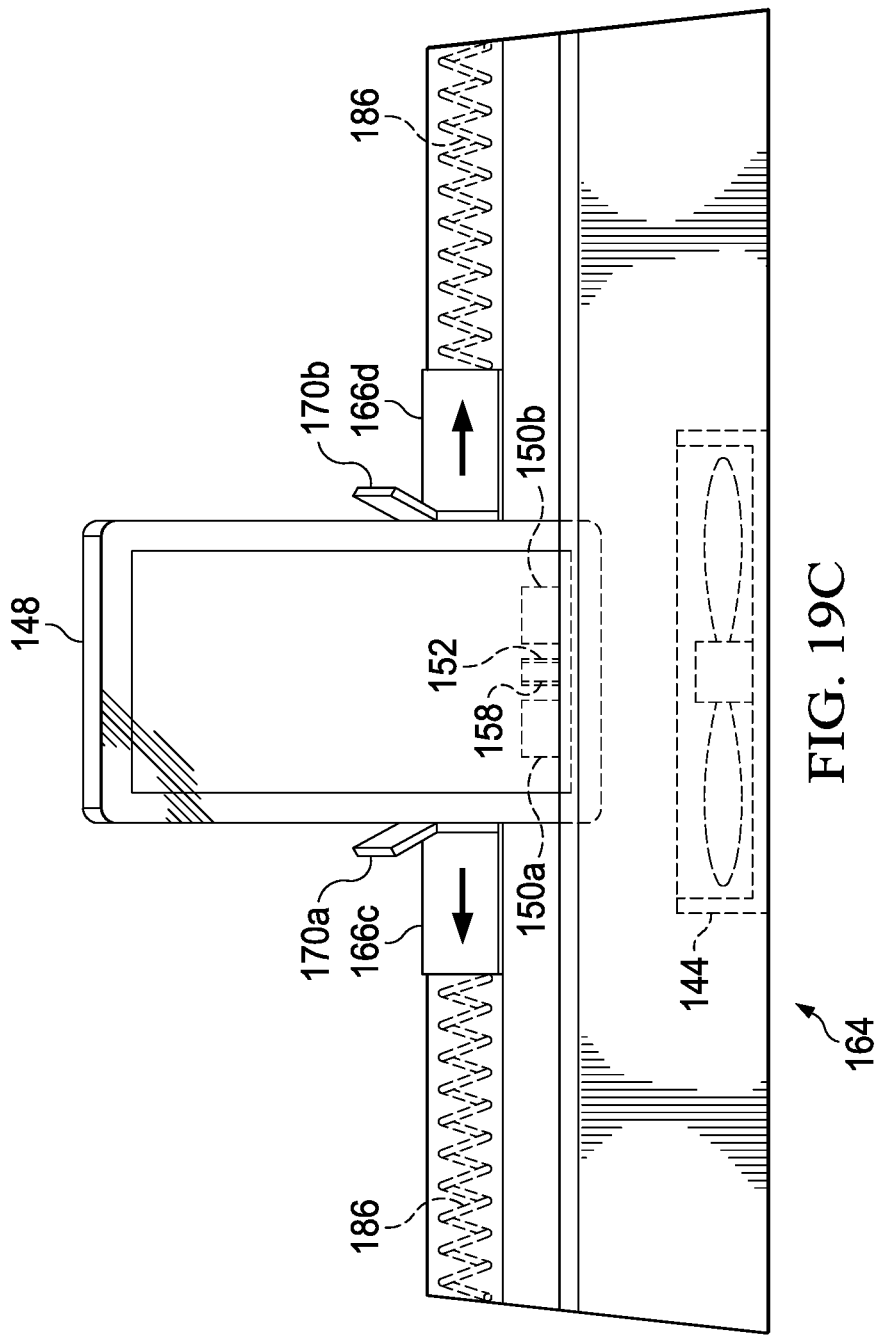

DOCKING STATION

CROSS-REFERENCE TO RELATED APPLICATIONS

This application is a national stage application under 35 U.S.C. § 371 of PCT International Application Serial No. PCT/US2015/062235, filed on Nov. 24, 2015 and entitled "DOCKING STATION," which is hereby incorporated by reference in its entirety.

TECHNICAL FIELD

This disclosure relates in general to the field of electronic devices, and more particularly, to a docking station for an electronic device.

BRIEF DESCRIPTION OF THE DRAWINGS

To provide a more complete understanding of the present disclosure and features and advantages thereof, reference is made to the following description, taken in conjunction with the accompanying FIGURES, embodiments are illustrated by way of example and not by way of limitation in the FIGURES of the accompanying drawings, in which like references indicate similar elements and in which:

FIG. 4 is a simplified flowchart illustrating potential operations associated with the communication system;

FIG. 5 is a simplified flowchart illustrating potential operations associated with the communication system;

FIG. 19C is a simplified schematic diagram illustrating a plan view of an embodiment of an electronic device with a docking station, in accordance with one embodiment of the present disclosure;

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1A:
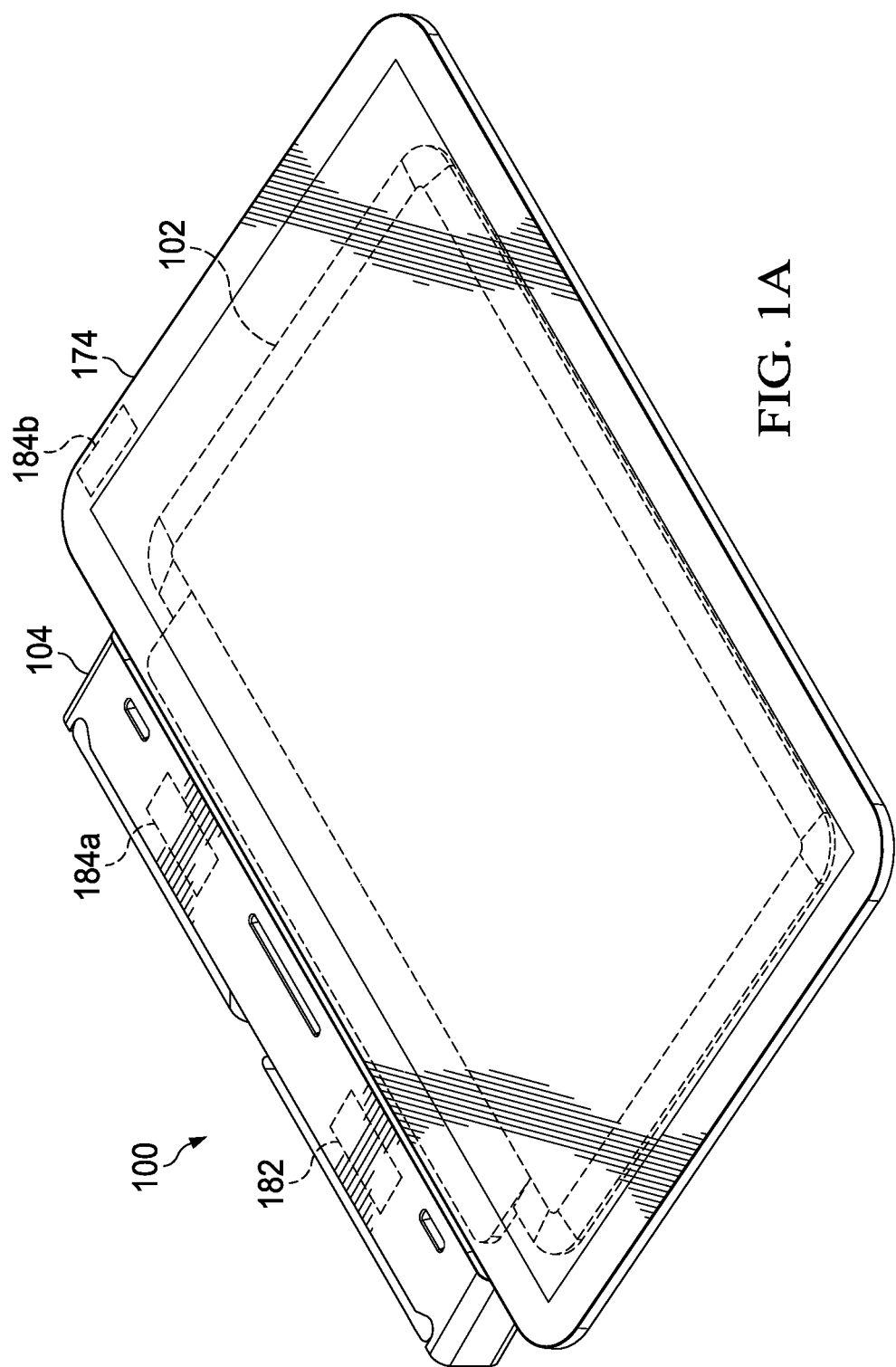
FIG. 1A is a simplified schematic diagram illustrating an orthogonal view of an embodiment of an electronic device with a docking station and a power transmitting unit (PTU), in accordance with one embodiment of the present disclosure.

FIG. 1A is a simplified orthogonal view illustrating an embodiment of an electronic system 100 in accordance with one embodiment of the present disclosure. Electronic system 100 can include a power transmitting unit (PTU) 102 and a docking station 104. Docking station 104 can include a control module 182 and a wireless module 184a. PTU 102 can be a wireless power transmitting unit, wireless charging pad or some other similar type of device that can wirelessly charge a device with a power receiving unit (PRU). Docking station 104 can be a docking station, port replicator, or similar type of dock that provides a way of connecting an electronic device to common peripherals. In an example, docking station 104 can be configured to allow for high speed input/output (I/O) and connection or coupling with multiple different types of peripherals. For example, docking station 104 can be configured for wireless gigabyte communications and I/O. In a specific example, docking station 104 can be configured for wireless data transfer speeds using 60 GHz Wi-Fi technology. Control module 182 can be configured to detect when PTU 102 is coupled to docking station 104 and control various functions or features of PTU 102 and docking station 104. In an example, a portable device 174 can be wirelessly charged by PTU 102. In addition, portable device 174 can include a wireless module 184b that can wireless communicate with wireless module 184a.

Figure 1B:
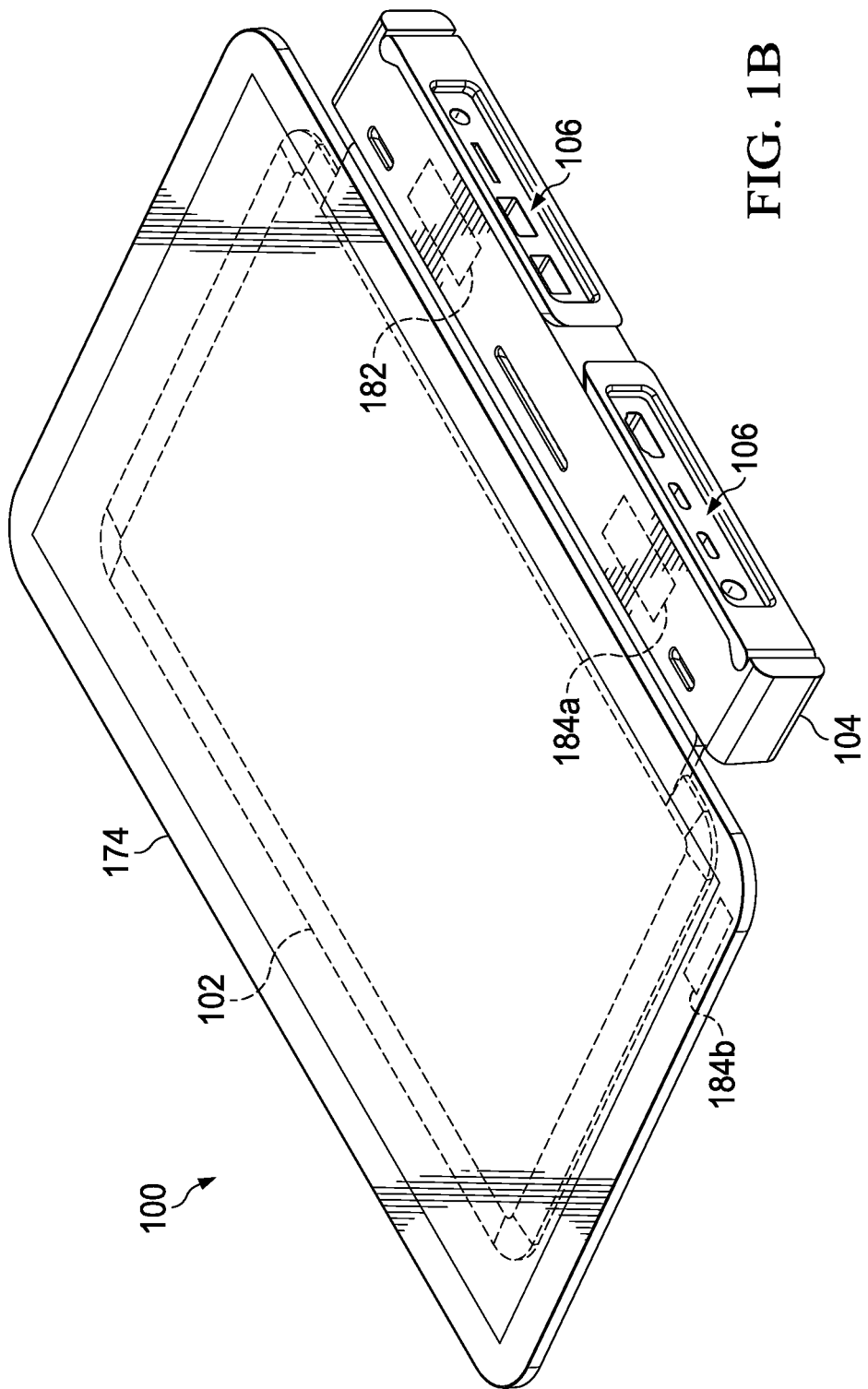
FIG. 1B is a simplified schematic diagram illustrating an orthogonal view of an embodiment of an electronic device with a docking station and a PTU, in accordance with one embodiment of the present disclosure.

Turning to FIG. 1B, FIG. 1B is a simplified orthogonal view illustrating an embodiment of electronic system 100 in accordance with one embodiment of the present disclosure. As illustrated in FIG. 1B, electronic system 100 can include PTU 102, docking station 104, one or more interconnects 106, and control module 182. Interconnects 106 can couple to one or more peripherals (e.g., printer, display, speakers, microphone, keyboard, mouse, additional storage or processing power, etc.) to allow for communication between each coupled peripheral and portable device 174.

Figure 1C:
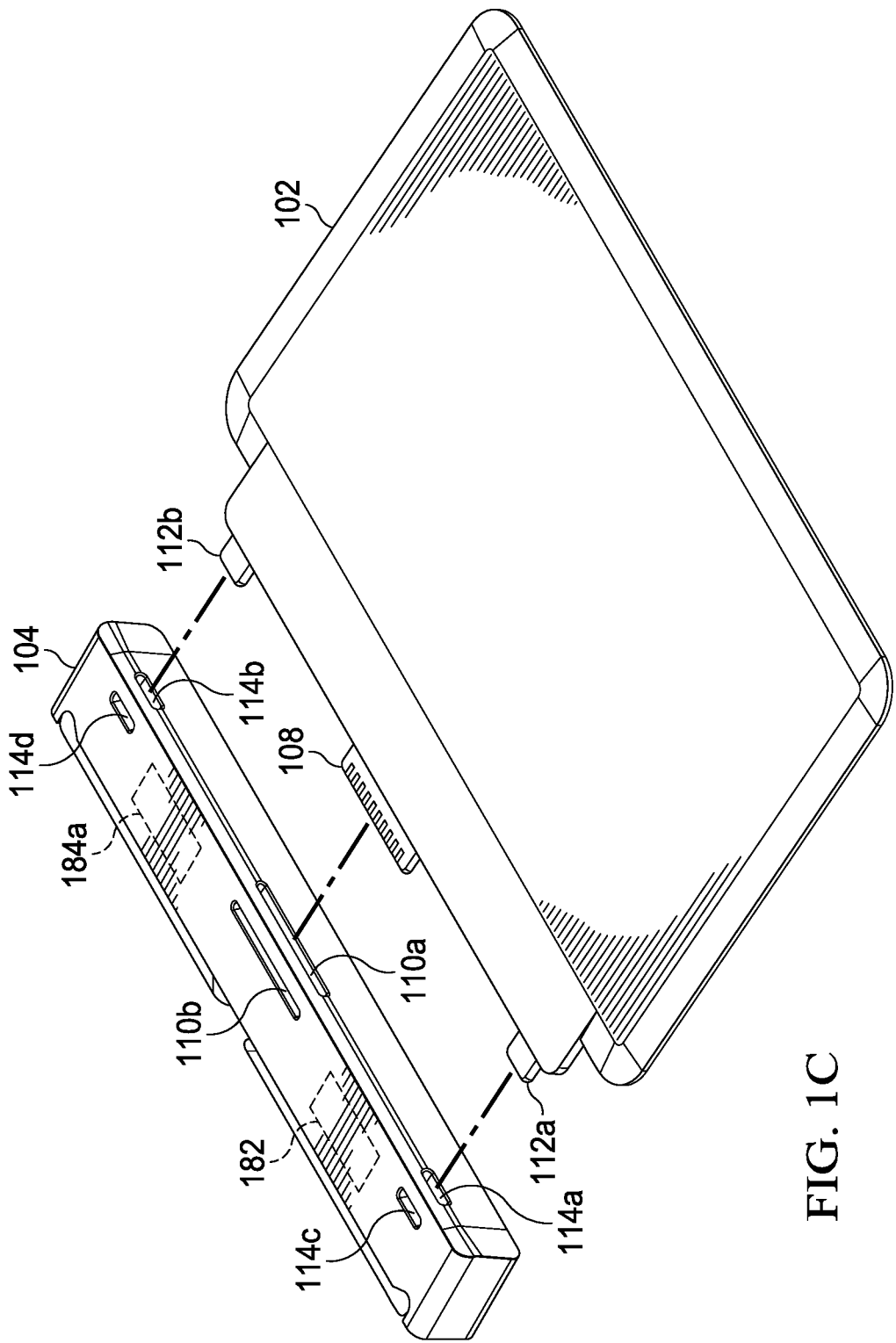
FIG. 1C is a simplified schematic diagram illustrating an orthogonal view of an embodiment of a docking station and a PTU, in accordance with one embodiment of the present disclosure.
Figure 1D:
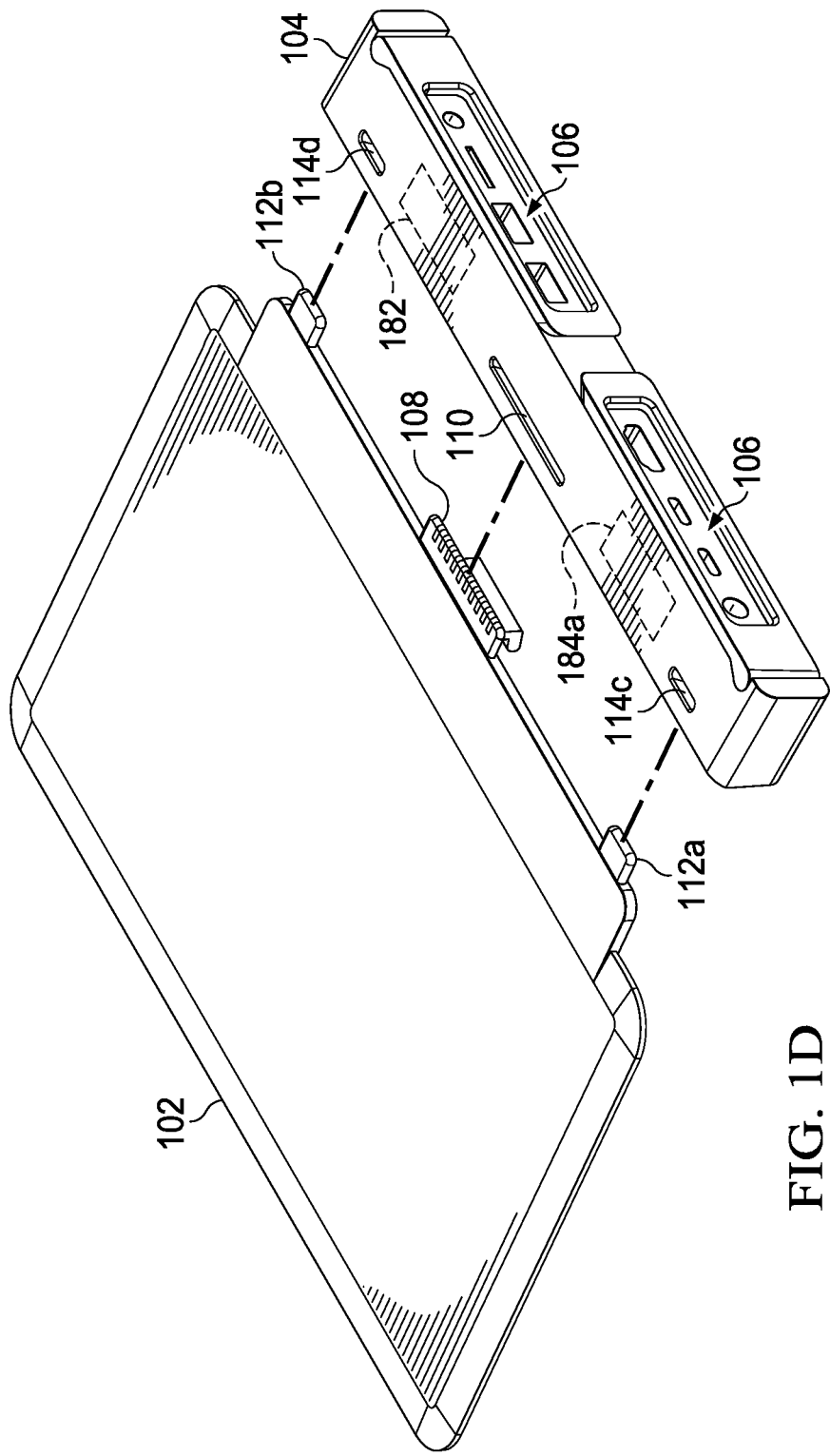
FIG. 1D is a simplified schematic diagram illustrating an orthogonal view of an embodiment of a docking station and a PTU, in accordance with one embodiment of the present disclosure.

Turning to FIGS. 1C and 1D, FIGS. 1C and 1D are a simplified orthogonal view illustrating an embodiment of an electronic system 100 in accordance with one embodiment of the present disclosure. As illustrated in FIGS. 1C and 1D, PTU 102 has been separated from docking station 104. PTU 102 can include PTU interconnect 108 and PTU guides 112a and 112b. Docking station 104 can include docking station interconnects 110a and 110b and docking station guides 114a-114d.

In an example, PTU interconnect 108 and docking station interconnect 110a can be coupled to allow communication and data flow between PTU 102 and docking station 104. In addition, PTU guides 112a and 112b can couple with docking station guides 114a and 114b respectively to help guide and couple PTU 102 to docking station 104. PTU guides 112a and 112b and docking station guides 114a and 114b can also help support PTU 102 when PTU 102 is coupled to docking station 104. In addition, PTU interconnect 108 and docking station interconnect 110b can be coupled to allow communication and data flow between PTU 102 and docking station 104. In addition, PTU guides 112a and 112b can couple with docking station guides 114c and 114d respectively to help guide and couple PTU 102 to docking station 104. PTU guides 112a and 112b and docking station guides 114c and 114d can also help support PTU 102 when PTU 102 is coupled to docking station 104. This allows PTU 102 to be coupled to docking station 104 in a horizontal or flat configuration as illustrated in FIGS. 1C and 1D or a vertical configuration as illustrated in FIGS. 1E and 1F.

Figure 1E:
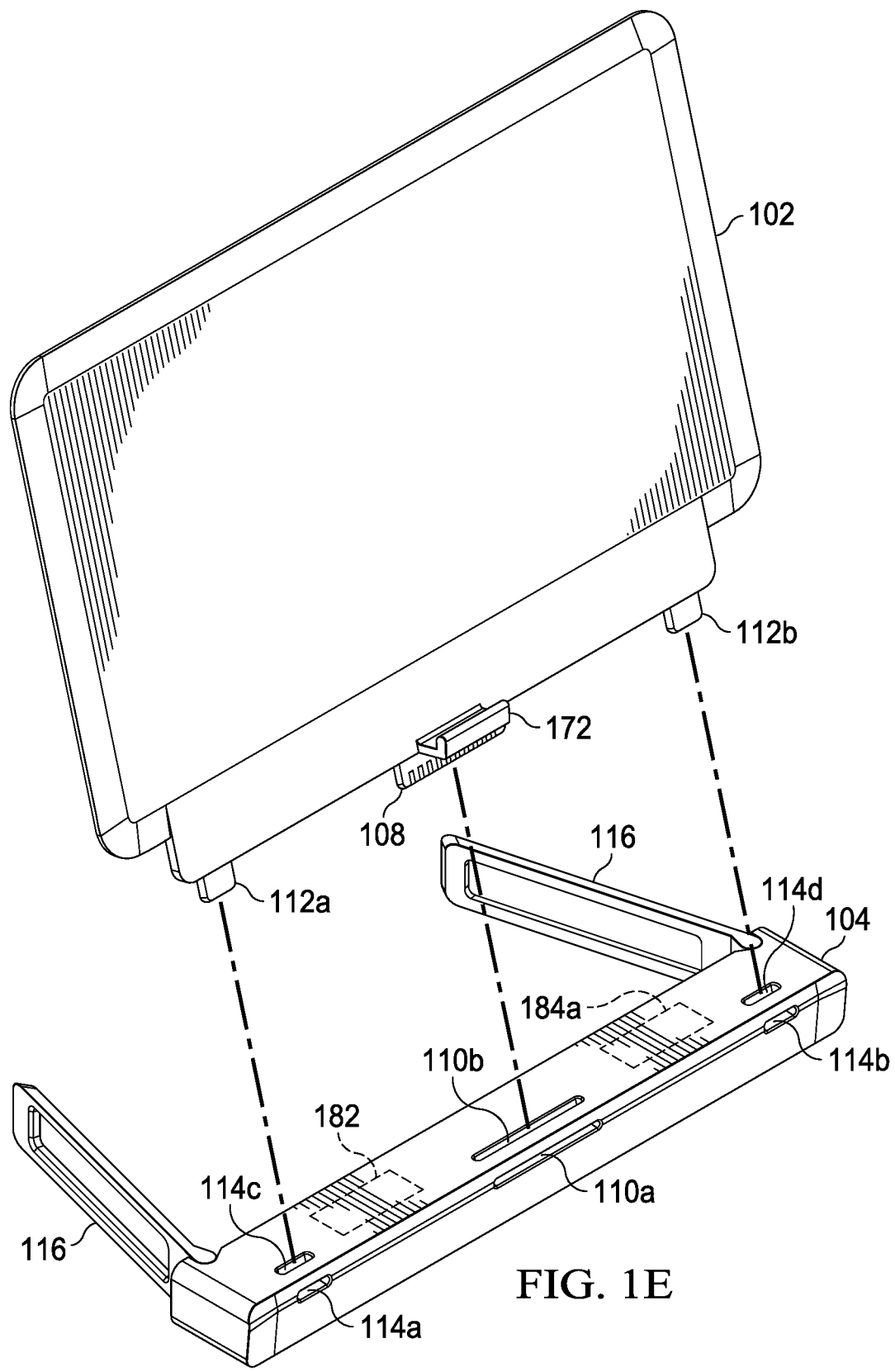
FIG. 1E is a simplified schematic diagram illustrating an orthogonal view of an embodiment of a docking station and a PTU, in accordance with one embodiment of the present disclosure.
Figure 1F:
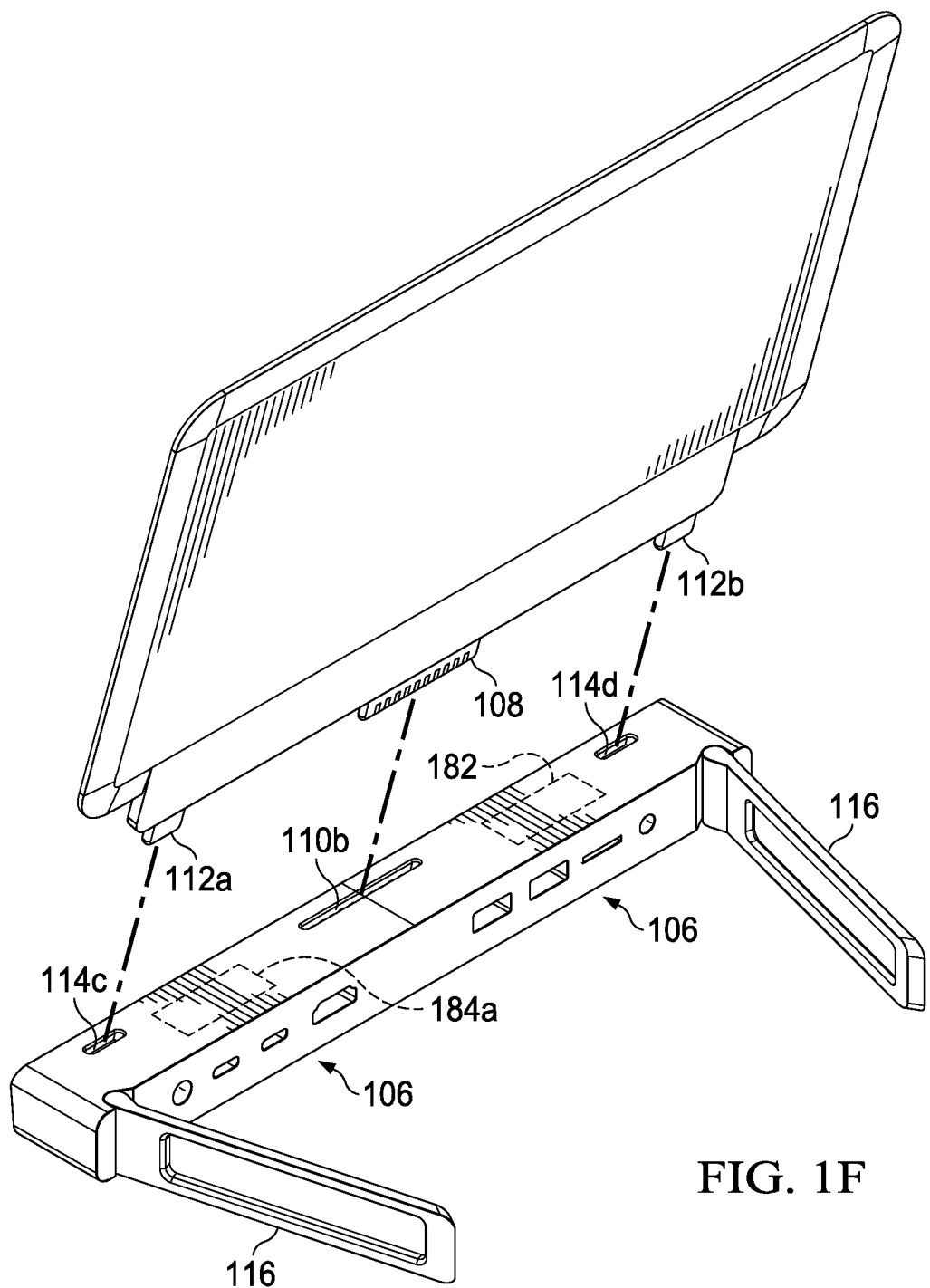
FIG. 1F is a simplified schematic diagram illustrating an orthogonal view of an embodiment of a docking station and a PTU, in accordance with one embodiment of the present disclosure.

Turning to FIGS. 1E and 1F, FIGS. 1E and 1F are a simplified orthogonal view illustrating an embodiment of an electronic system 100 in accordance with one embodiment of the present disclosure. PRU 102 can include a portable device support 172. Docking station 104 can include one or more support arms 116. As illustrated in FIGS. 1E and 1F, PTU 102 can be coupled to docking station 102 in a vertical configuration. For example, PTU guides 112a and 112b can couple with docking station guides 114c and 114d respectively to help guide and couple PTU 102 to docking station 104. PTU guides 112a and 112b and docking station guides 114c and 114d can also help support PTU 102 when PTU 102 is coupled to docking station 104.

Figure 1G:
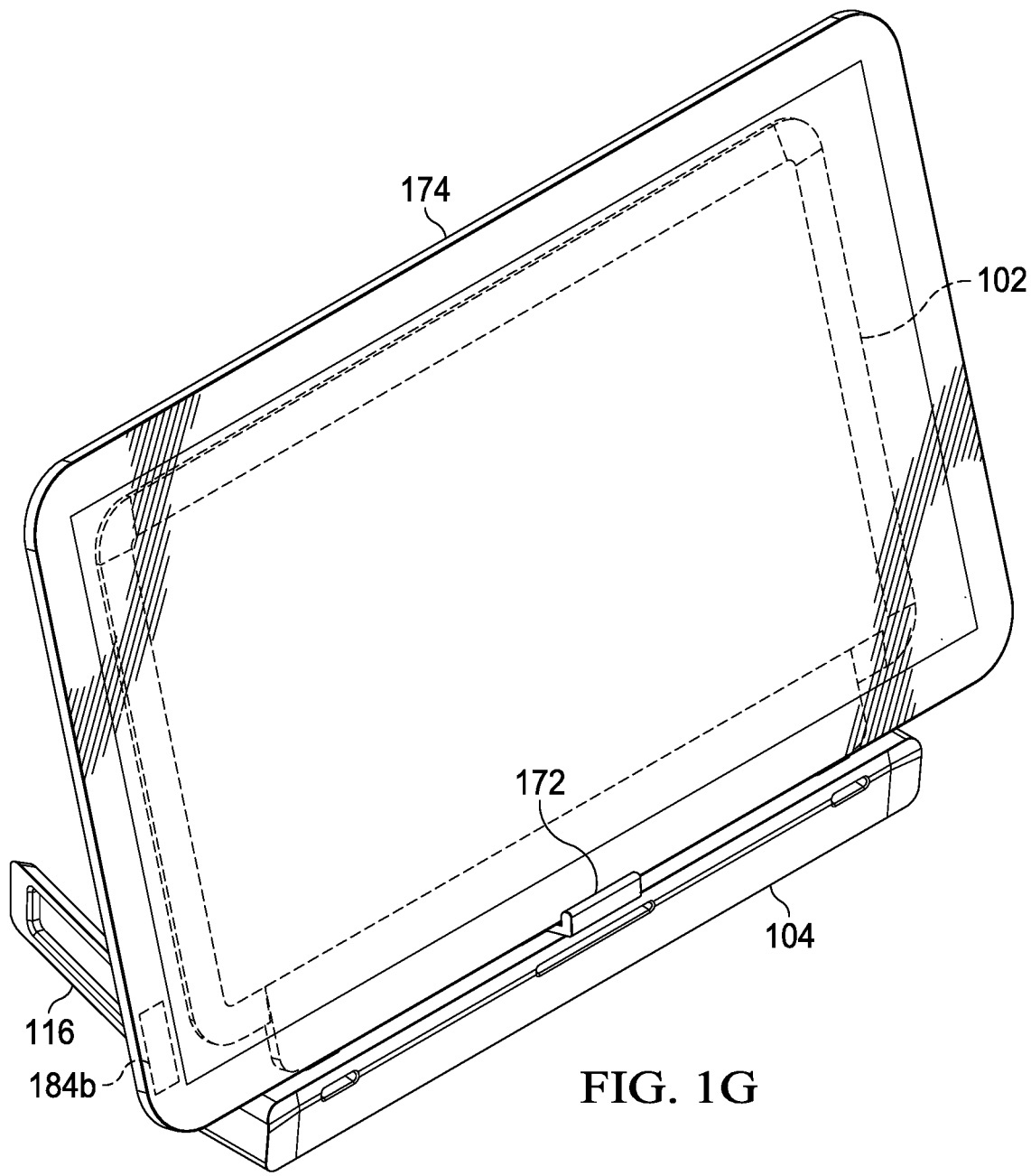
FIG. 1G is a simplified schematic diagram illustrating an orthogonal view of an embodiment of an electronic device with a docking station and a PTU, in accordance with one embodiment of the present disclosure.
Figure 1H:
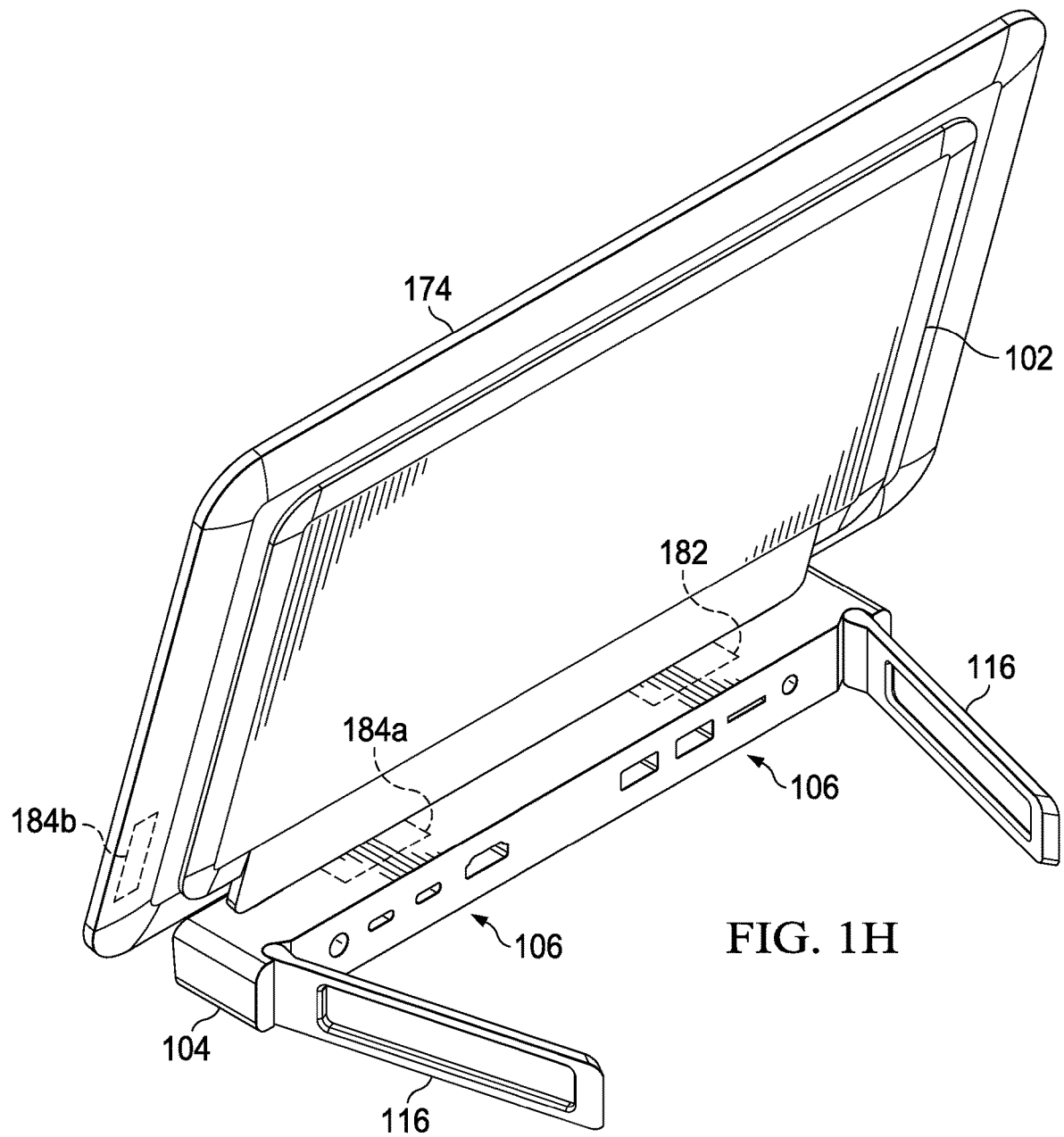
FIG. 1H is a simplified schematic diagram illustrating an orthogonal view of an embodiment of an electronic device with a docking station and a PTU, in accordance with one embodiment of the present disclosure.

Turning to FIGS. 1G and 1H, FIGS. 1G and 1H are a simplified orthogonal view illustrating an embodiment of an electronic system 100 in accordance with one embodiment of the present disclosure. Portable device support 172 can be configured to support portable device 174 (e.g., laptop computer, mobile device, personal digital assistant, smartphone, tablet, or other similar device). Docking station 104 can include one or more support arms 116 and support arms 116 can help mitigate tipping of PTU 102 and docking station 104.

Electronic system 100 can include various components of the internal electronic system of an electronic device. The components may include a central processing unit (CPU), a memory, etc. Any processors (inclusive of digital signal processors, microprocessors, supporting chipsets, etc.), memory elements, etc. can be suitably coupled to a motherboard based on particular configuration needs, processing demands, computer designs, etc. Other components such as external storage, controllers for video display, sound, and peripheral devices may be attached to the motherboard as plug-in cards, via cables, or integrated into the motherboard itself.

In regards to the internal structure associated with electronic system 100, each of PTU 102, docking station 104, and portable device 174 can include memory elements for storing information to be used in the operations outlined herein. Each of PTU 102, docking station 104, and portable device 174 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in electronic system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, elements of electronic system 100, such as PTU 102, docking station 104, and portable device 174 may include software modules (e.g., control module 182 and wireless modules 184a and 184b) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of PTU 102, docking station 104, and portable device 174 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Note that particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and often radio frequency functions: all of which may be provided on a single chip substrate.

For purposes of illustrating certain example features of electronic system 100, the following foundational information may be viewed as a basis from which the present disclosure may be properly explained.

A wireless charging mat (WCM), wireless charging port or pad, etc. enables a system to be charged wirelessly. Currently known wireless charging systems (mats (WCM), wireless charging ports or pad, etc.) do not have the capability to support high speed I/O and peripherals. Additionally, no currently known systems that have the capability to support high speed I/O and peripherals can support wireless charging. For example, current systems with the capability to support high speed I/O and peripherals depend on a wired power supply, requiring the user to connect the system by wire to get a full docking experience. While individually the technologies address a usage gap, in combination, neither of the technologies can fully deliver a true "no wires" experience as they are burdened by the need for independent wired power sources.

An electronic system, as outlined in FIGS. 1A-1H, can resolve these issues (and others). Electronic system 100 can include PTU 102 and docking station 104. PTU 102 can be coupled to docking station 104 in various configurations, for example, as illustrated in FIGS. 1C and 1D and as illustrated in FIGS. 1E and 1F. PTU 102 can be configured to allow wireless charging of an electronic device (e.g., portable device 174). Docking station 104 can be configured to support high speed I/O and wirelessly couple to an electronic device (e.g., portable device 174). In addition, when PTU 102 is coupled to docking station 104, docking station 104 can be configured to determine system parameters and communicate power levels to PTU 102 for wirelessly charging of an electronic device.

Figure 2A:
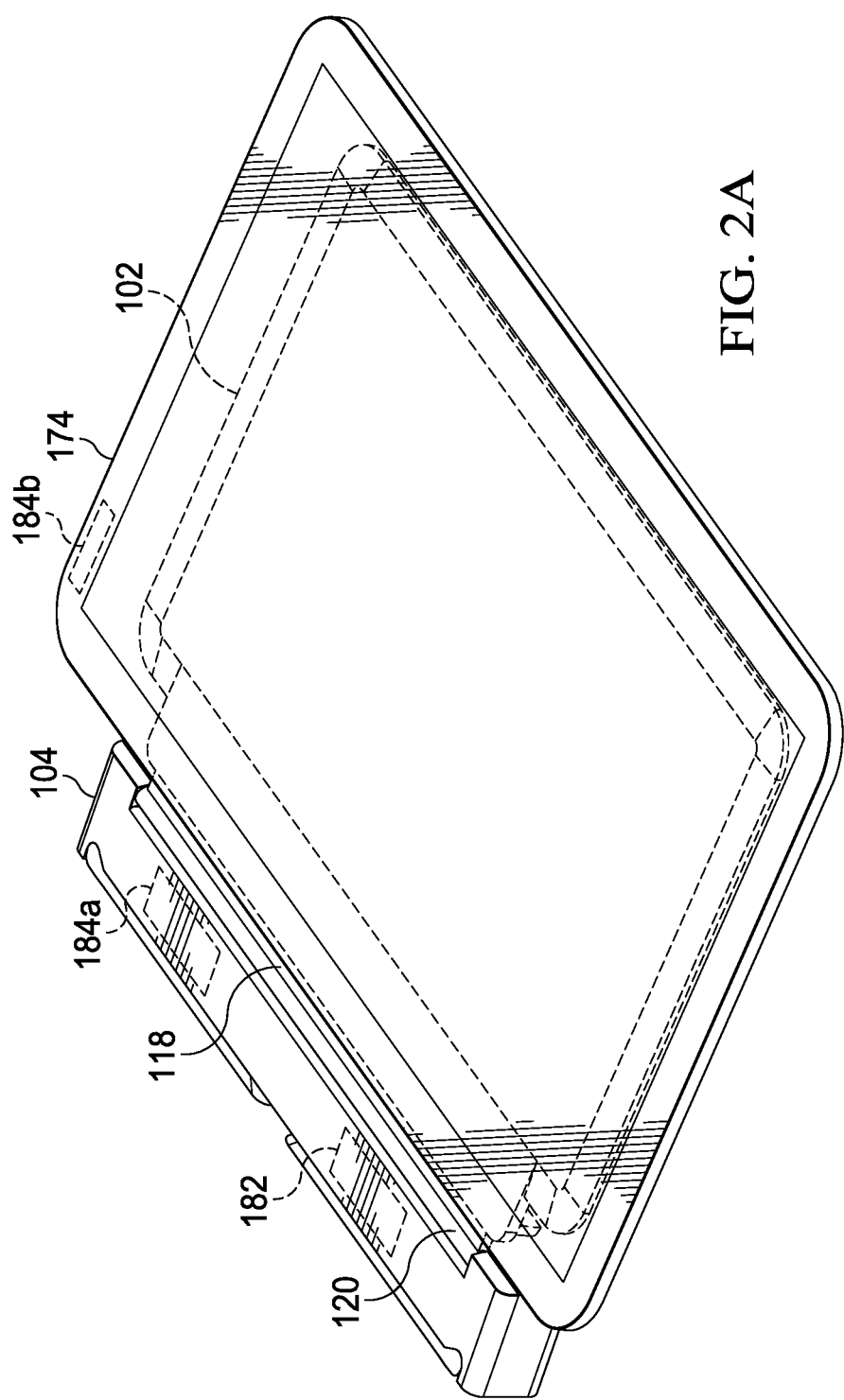
FIG. 2A is a simplified schematic diagram illustrating an orthogonal view of an embodiment of an electronic device with a docking station and a PTU, in accordance with one embodiment of the present disclosure.

Turning to FIG. 2A, FIG. 2A is a simplified orthogonal view illustrating an embodiment of electronic system 100 in accordance with one embodiment of the present disclosure. As illustrated in FIG. 2A, PTU 102 is coupled to docking station 104 in a horizontal configuration. Portable device 174 can be positioned on PTU 102 to allow for wireless charging of portable device 174.

Figure 2B:
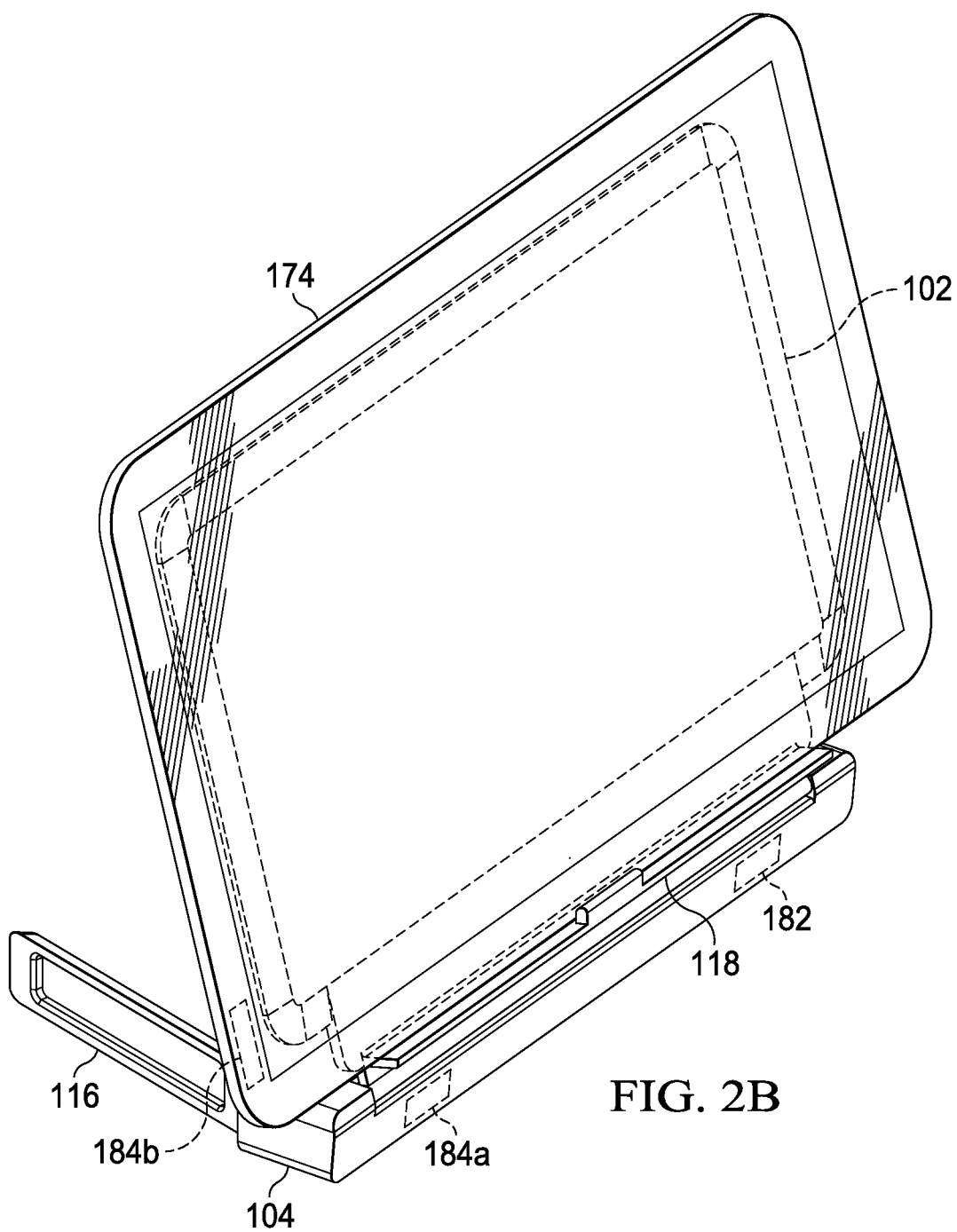
FIG. 2B is a simplified schematic diagram illustrating an orthogonal view of an embodiment of an electronic device with a docking station and a PTU, in accordance with one embodiment of the present disclosure.

Turning to FIG. 2B, FIG. 2B is a simplified orthogonal view illustrating an embodiment of electronic system 100 in accordance with one embodiment of the present disclosure. As illustrated in FIG. 2B, PTU 102 is coupled to docking station 104 in a vertical configuration. Portable device 174 can be positioned on PTU 102 to allow for wireless charging of portable device 174. Support arms 116 can help support PTU 102 and portable device 174 and mitigate tipping.

Figure 2C:
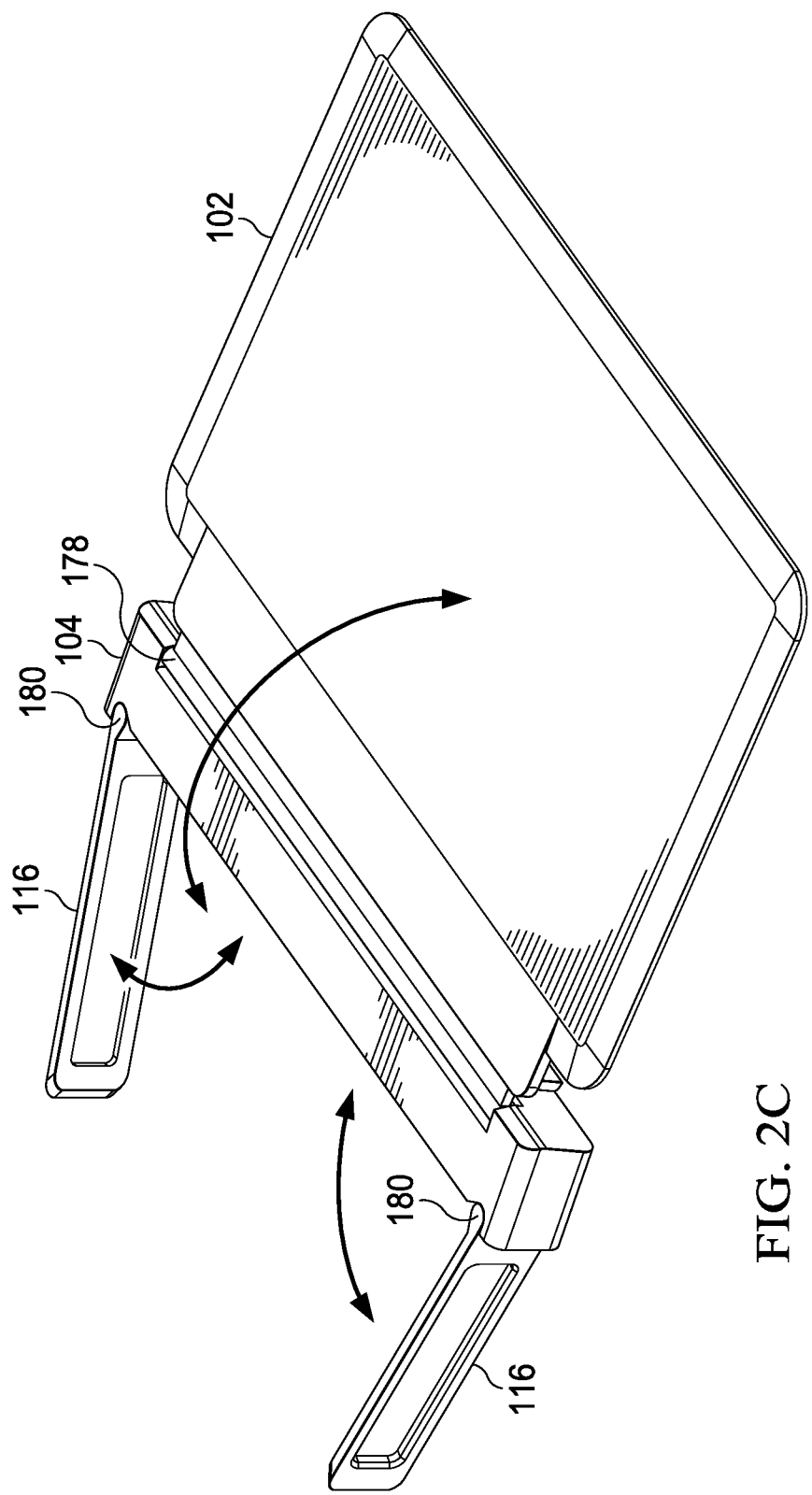
FIG. 2C is a simplified schematic diagram illustrating an orthogonal view of an embodiment of a docking station and a PTU, in accordance with one embodiment of the present disclosure.

Turning to FIG. 2C, FIG. 2C is a simplified orthogonal view illustrating an embodiment of electronic system 100 in accordance with one embodiment of the present disclosure. In an example, docking station 104 can include a PTU hinge 178 and a support arm hinge 180. PTU hinge 178 can rotatably couple PTU 102 to docking station 104 and allow PTU 102 rotate relative to docking station 104. For example, PTU hinge 178 can allow PTU 102 to rotate from a horizontal configuration shown in FIG. 2A to a vertical configuration shown in FIG. 2B and back again to the horizontal configuration shown in FIG. 2A. Support arm hinge 180 can rotatably couple each support arm 116 to docking station 104 and allow each support arm 116 to rotate relative to docking station 104. For example, support arm hinge 180 can allow each support arm 116 to rotate from a storage or stowed configuration shown in FIG. 2A to an open or support configuration shown in FIG. 2B and back again to the storage or stowed configuration shown in FIG. 2A.

Figure 3:
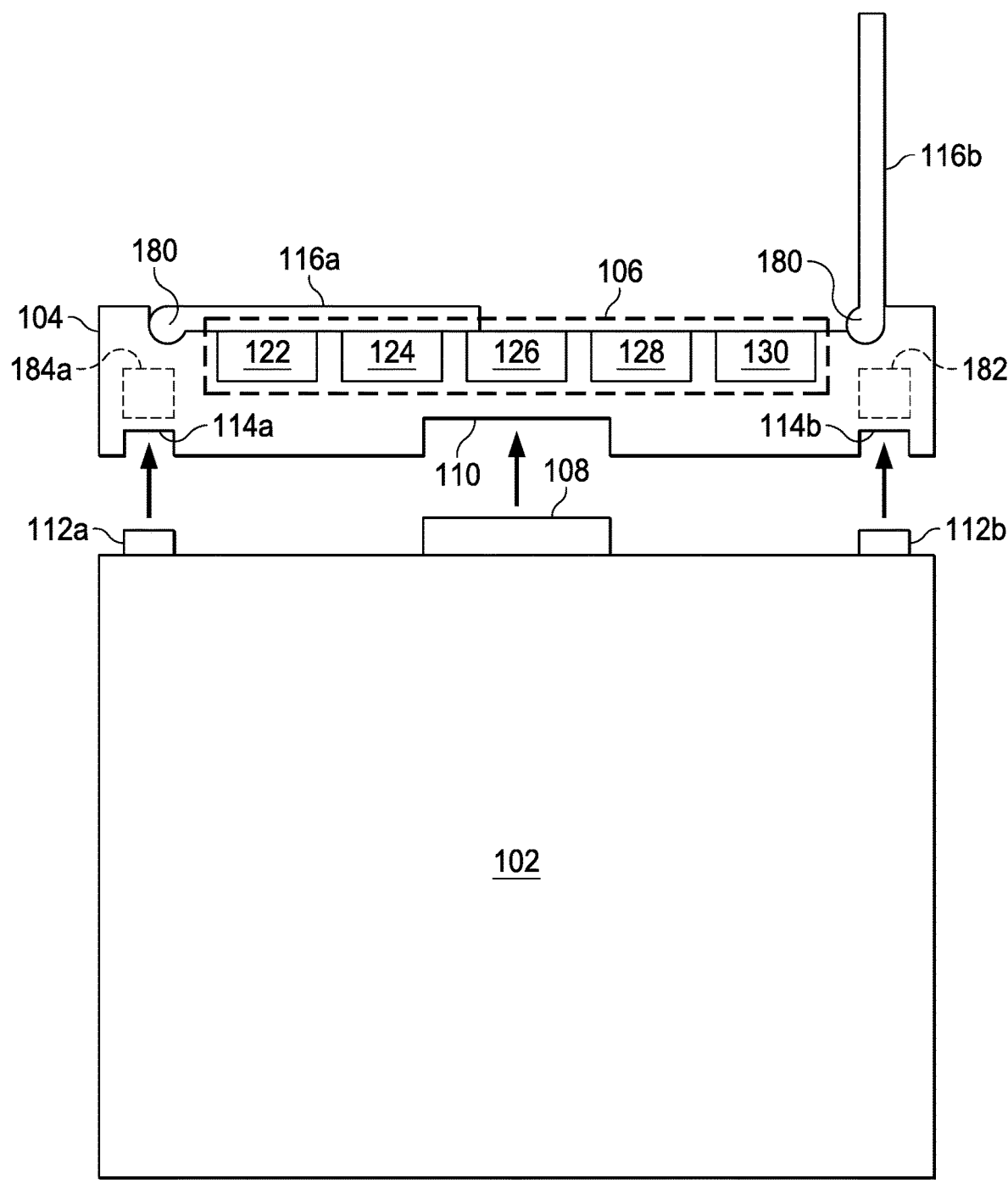
FIG. 3 is a simplified schematic diagram illustrating a block diagram view of an embodiment of a docking station and a PTU, in accordance with one embodiment of the present disclosure.

Turning to FIG. 3, FIG. 3 is a simplified block view illustrating an embodiment of electronic system 100 in accordance with one embodiment of the present disclosure. As illustrated in FIG. 3, support arm 116a is in a storage or stowed configuration and support arm 116b is in an open or support configuration. Interconnects 106 on docking station 104 can include one or more interconnects. For example, interconnects 106 can include a display interconnect 122, a printer interconnect 124, a keyboard interconnect 126, an audio interconnect 128, and a wireless module interconnect 130. Display interconnect 122 can allow for a display to be coupled to docking station 104. Printer interconnect 124 can allow for a printer to be coupled to docking station 104. Keyboard interconnect 126 can allow for a keyboard to be coupled to docking station 104. Audio interconnect 128 can allow for an audio device such a microphone, speakers, etc. to be coupled to docking station 104. Wireless module interconnect 130 can allow for a wireless module such as a Wi-Fi module, Bluetooth module, etc. to be coupled to docking station 104. Interconnects 106 can include other interconnects such as a video camera or web camera. Interconnects 106 and wireless module 184a can help facilitate high speed I/O communications between an electronic device and peripherals coupled to docking station 104.

Turning to FIG. 4, FIG. 4 is an example flowchart illustrating possible operations of a flow 400 that may be associated with a docking station, in accordance with an embodiment. In an embodiment, one or more operations of flow 400 may be performed by control module 182 and wireless modules 184a and 184b. At 402, an electronic device is coupled to a docking station. For example, portable device 174 may be coupled to docking station 104 and a communication path between portable device 174 and docking station 104 may be established using wireless modules 184a and 184b. At 404, I/O paths are established. For example, one or more peripherals may be connected to one or more interconnects 106. At 406, the system determines if a wireless charging device is connected. For example, the system may determine if PTU 102 is coupled to docking station 104. If a wireless charging device is not connected, then the process ends. If a wireless charging device is connected, then a charging control mode is initiated, as in 408. At 410, system parameters are determined. For example, the system parameters can include battery power levels, current performance, any I/Os being used or not used, system thermal data, surface temperature or Tskin of the device, etc. At 412, desired power levels are communicated to the wireless charging device. For example, based on the determined system parameters, a charging power level for an electronic device can be determined.

Turning to FIG. 5, FIG. 5 is an example flowchart illustrating possible operations of a flow 500 that may be associated with a data rating system, in accordance with an embodiment. In an embodiment, one or more operations of flow 500 may be performed by control module 182 and wireless modules 184a and 184b. At 502, an electronic device is coupled to a wireless charging device. At 504, the system determines if a docking station is coupled to the wireless charging device. If a docking station is not coupled to the wireless charging device, then the process ends. If a docking station is coupled to the wireless charging device, then desired power levels are determined, as in 506. For example, the docking station can determine power levels as described with reference to FIG. 4. At 508, an orientation of the electronic device is determined. At 510, a correct PTU to charge the electronic device is determined. At 512, power levels are adjusted.

Figure 6A:
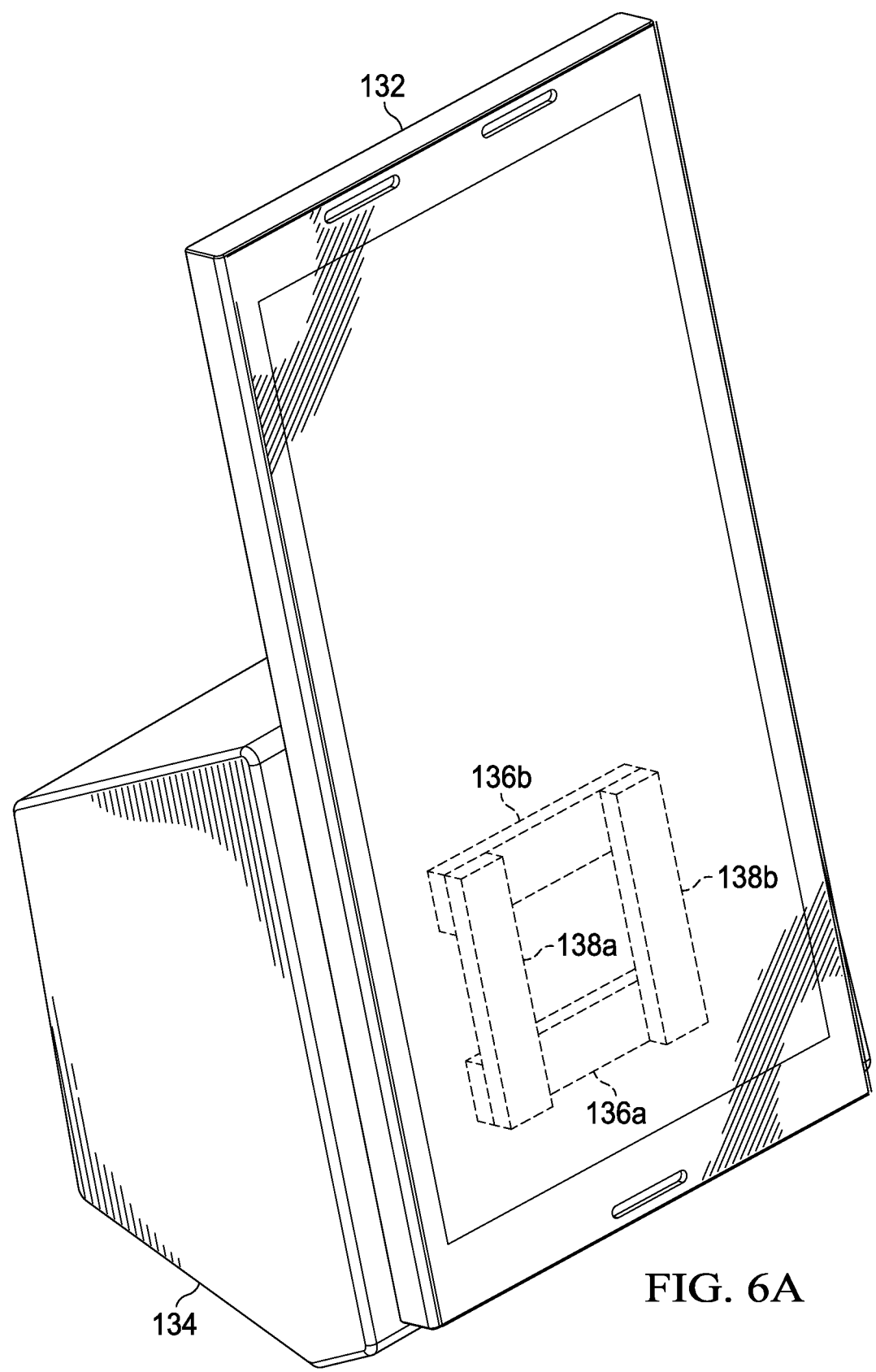
FIG. 6A is a simplified schematic diagram illustrating an orthogonal view of an embodiment of an electronic device with a docking station, in accordance with one embodiment of the present disclosure.

Turning to FIG. 6A, FIG. 6A is a simplified orthogonal view of a stand 134, in accordance with one embodiment of the present disclosure. Stand 134 can include stand guides 136a and 136b. In an example, a device 132 can include device guides 138a and 138b. Stand guides 136a and 136b can be configured to couple to device guides 138a and 138b and help secure device 132 to stand 134. In a specific example, stand guides 136a and 136b and device guides 138a and 138b can include magnets such that device 132 can be magnetically coupled to stand 134.

Figure 6B:
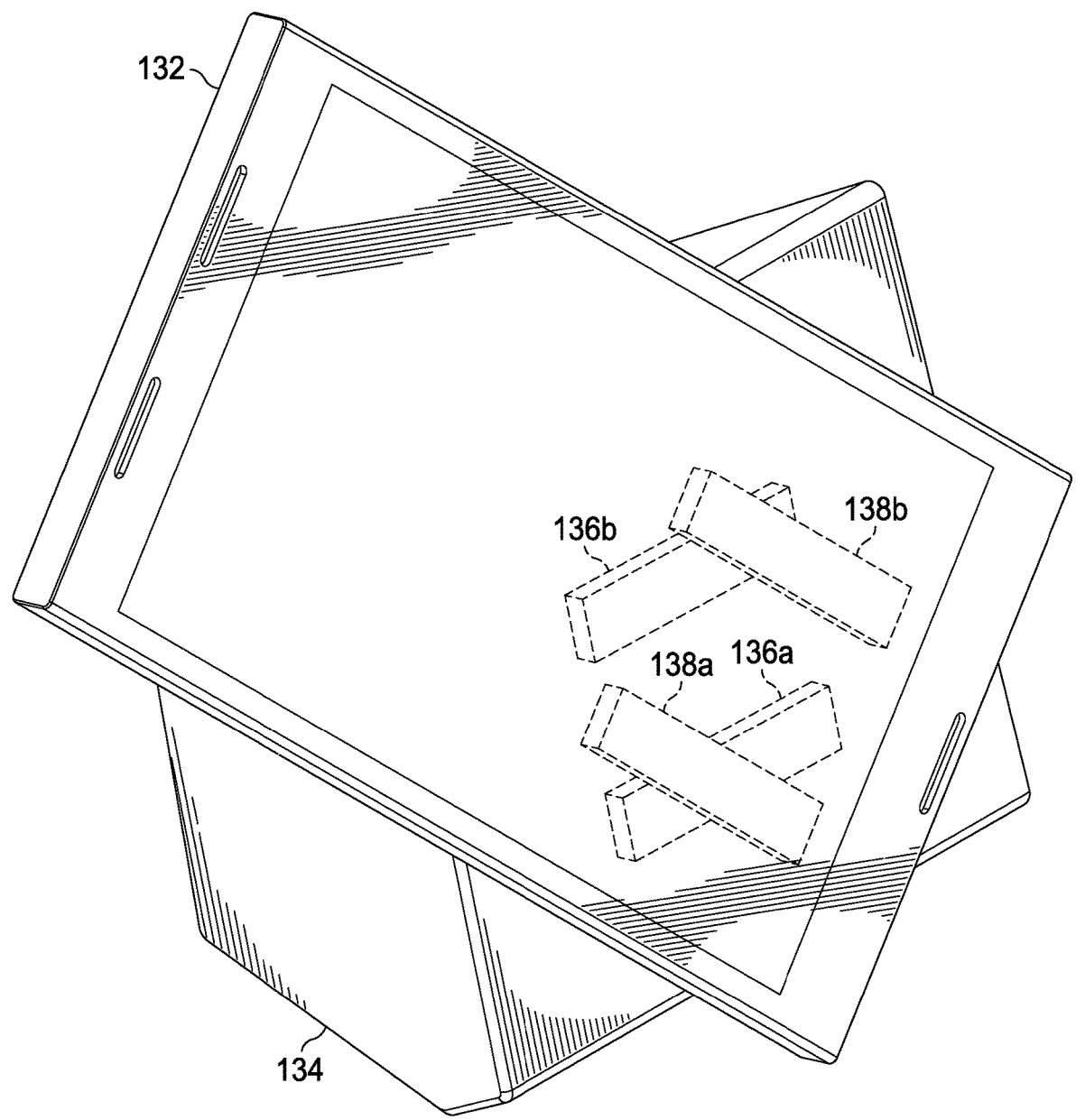
FIG. 6B is a simplified schematic diagram illustrating an orthogonal view of an embodiment of an electronic device with a docking station, in accordance with one embodiment of the present disclosure.

Turning to FIG. 6B, FIG. 6B is a simplified orthogonal view illustrating an embodiment of stand 134, in accordance with one embodiment of the present disclosure. As illustrated in FIG. 6B, device 132 can be rotated relative to stand 134. For example, device 132 may be rotated from a portrait configuration to a landscape configuration.

Figure 6C:
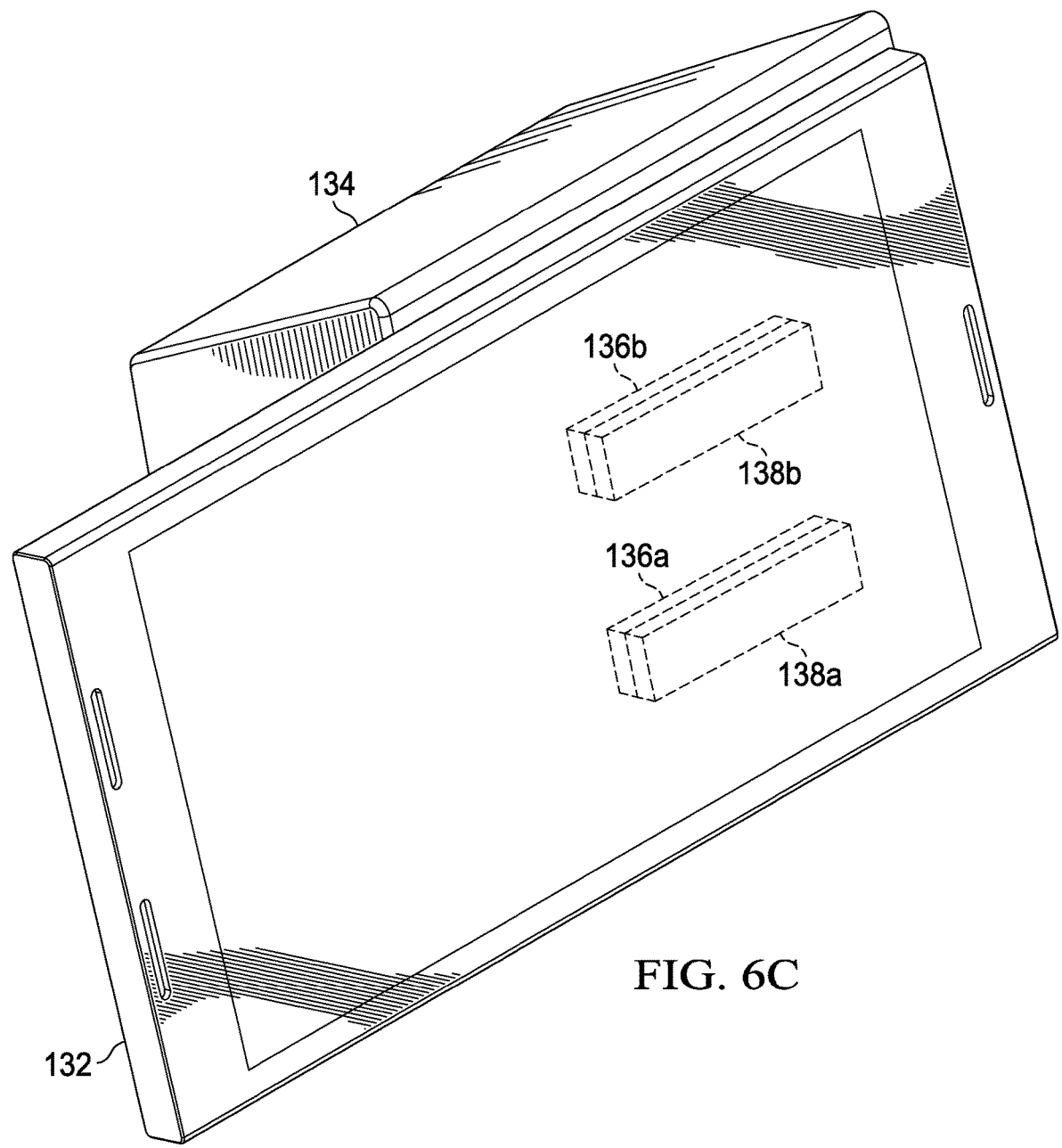
FIG. 6C is a simplified schematic diagram illustrating an orthogonal view of an embodiment of an electronic device with a docking station, in accordance with one embodiment of the present disclosure.

Turning to FIG. 6C, FIG. 6C is a simplified orthogonal view illustrating an embodiment of stand 134, in accordance with one embodiment of the present disclosure. As illustrated in FIG. 6C, device has been rotated from a portrait configuration illustrated in FIG. 6A to a landscape configuration. Stand guides 136a and 136b can be configured to couple to device guides 138a and 38b and help secure device 132 to stand 134. For example, in the illustrated landscape configuration, stand guide 136a can couple with device guide 138a and stand guide 136b can couple with device guide 138b.

Figure 7:
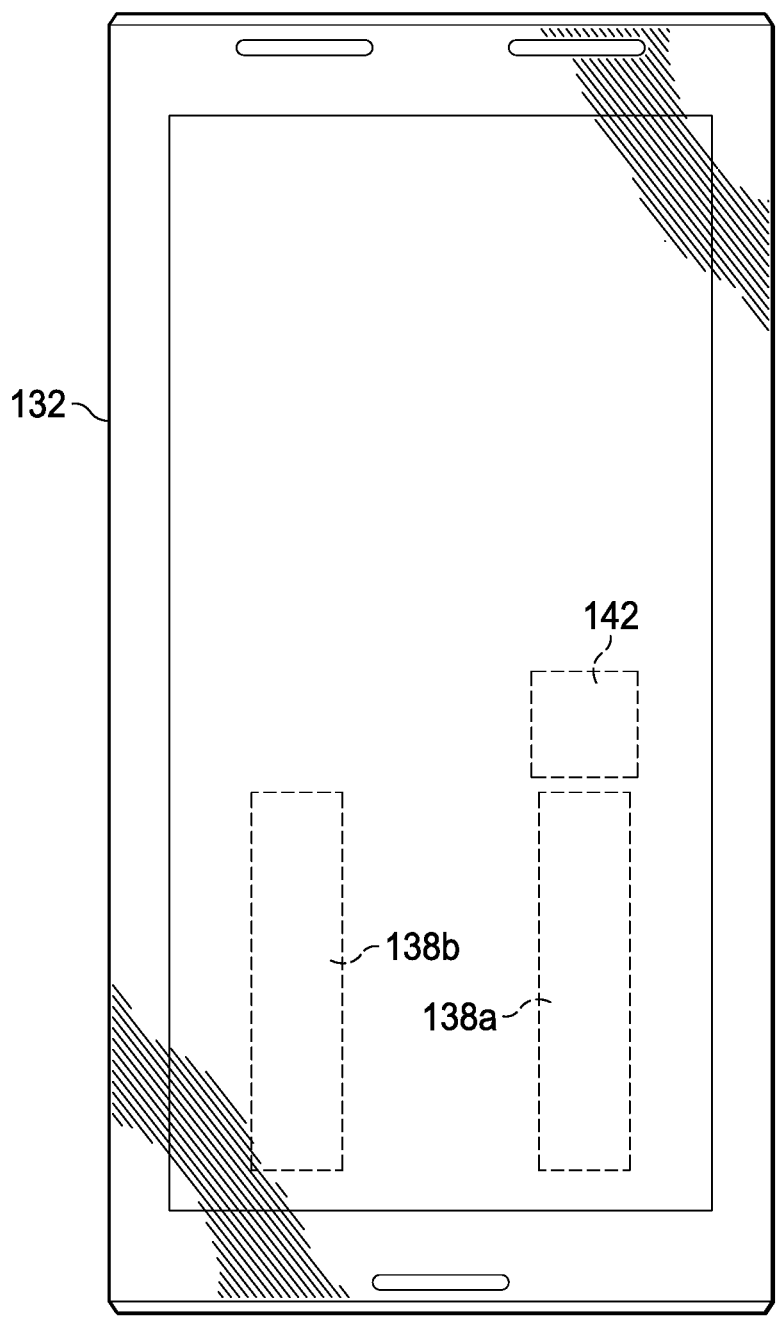
FIG. 7 is a simplified schematic diagram illustrating a plan view of an embodiment of an electronic device, in accordance with one embodiment of the present disclosure.

Turning to FIG. 7, FIG. 7 is a simplified a plan view illustrating an embodiment of device 132, in accordance with one embodiment of the present disclosure. Device 132 can include device guides 138a and 38b and PRU 142. PRU 142 can be configured to couple with a PTU and wireless charge an on board battery of device 132.

Figure 8:
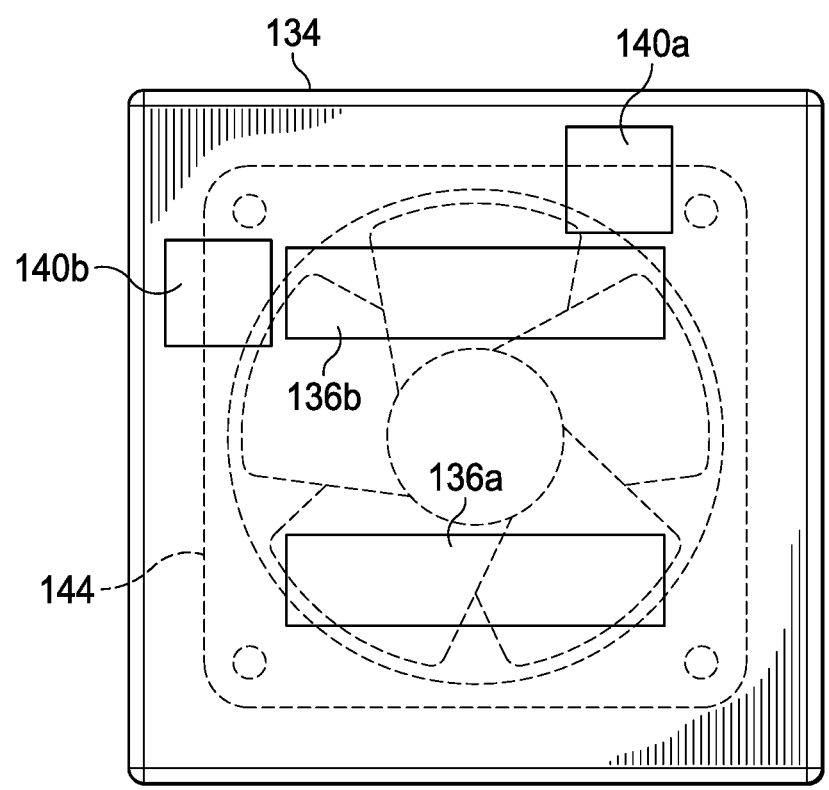
FIG. 8 is a simplified schematic diagram illustrating a plan view of an embodiment of a docking station, in accordance with one embodiment of the present disclosure.

Turning to FIG. 8, FIG. 8 is a simplified plan view illustrating an embodiment of stand 134, in accordance with one embodiment of the present disclosure. Stand 134 can include stand guides 136a and 136b, one or more PTUs 140a and 140b, and a cooling device 144. Each one or more PTUs 140a and 140b can be configured to couple with a PRU (e.g., PRU 142) and wireless charge an on board battery of device (e.g., device 132). Cooling device 144 can be configured to cool a device (e.g., device 132) when the device is coupled to stand 134. In an example, cooling device 144 may be an electric fan.

Figure 9:
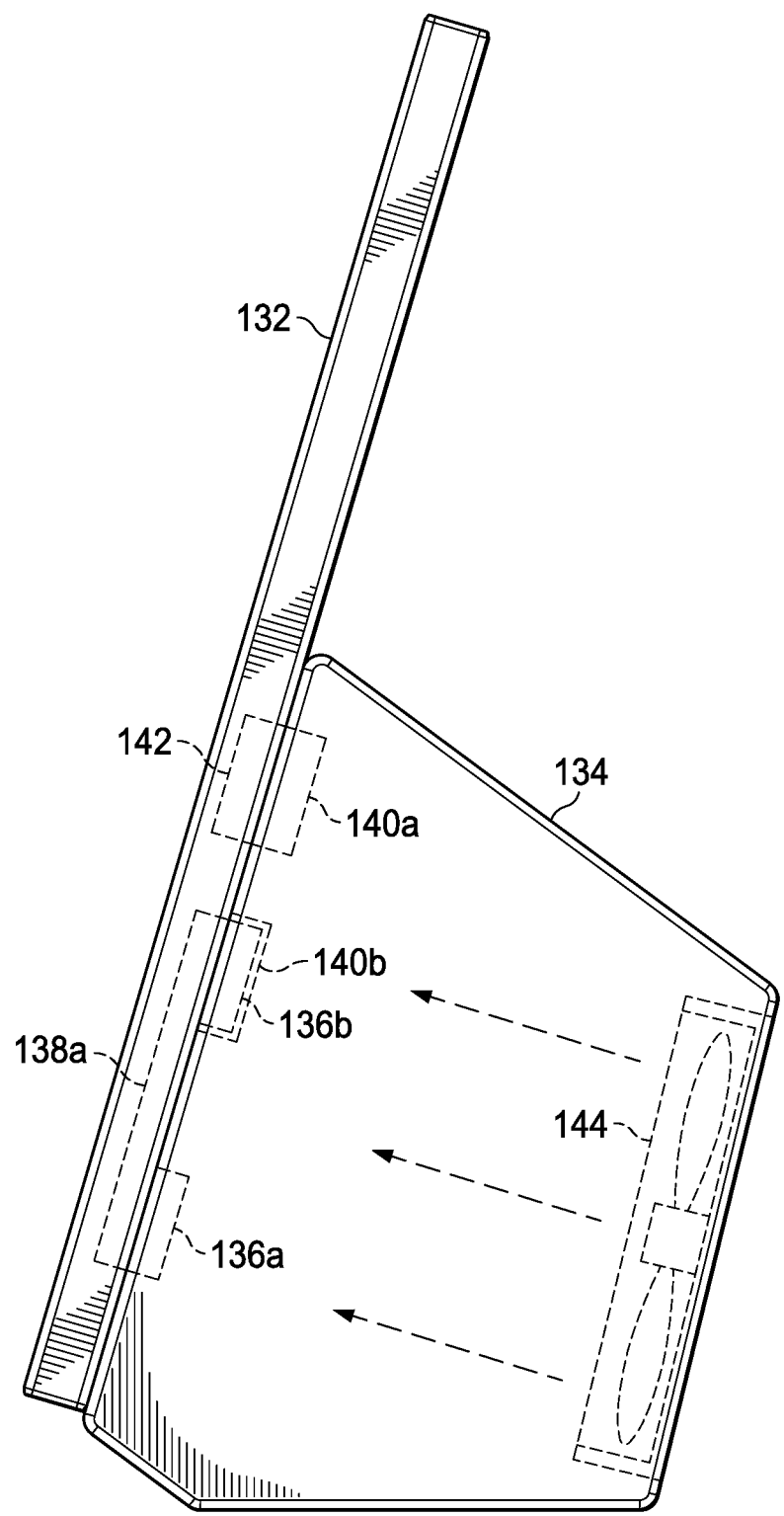
FIG. 9 is a simplified schematic diagram illustrating a side view of an embodiment of an electronic device with a docking station, in accordance with one embodiment of the present disclosure.

Turning to FIG. 9, FIG. 9 is a simplified side view illustrating an embodiment of device 132 coupled to stand 134 in a portrait configuration, in accordance with one embodiment of the present disclosure. Stand guides 136a and 136b can be configured to couple to device guides 138a and 38b and help secure device 132 to stand 134. Stand guides 136a and 136b can also be configured to couple to device guides 138a and 38b and help align PTU 140a with PRU 142 to allow for wireless charging of device 132. Cooling device 144 can be configured to cool device 132 when device 132 is coupled to stand 134.

Figure 10:
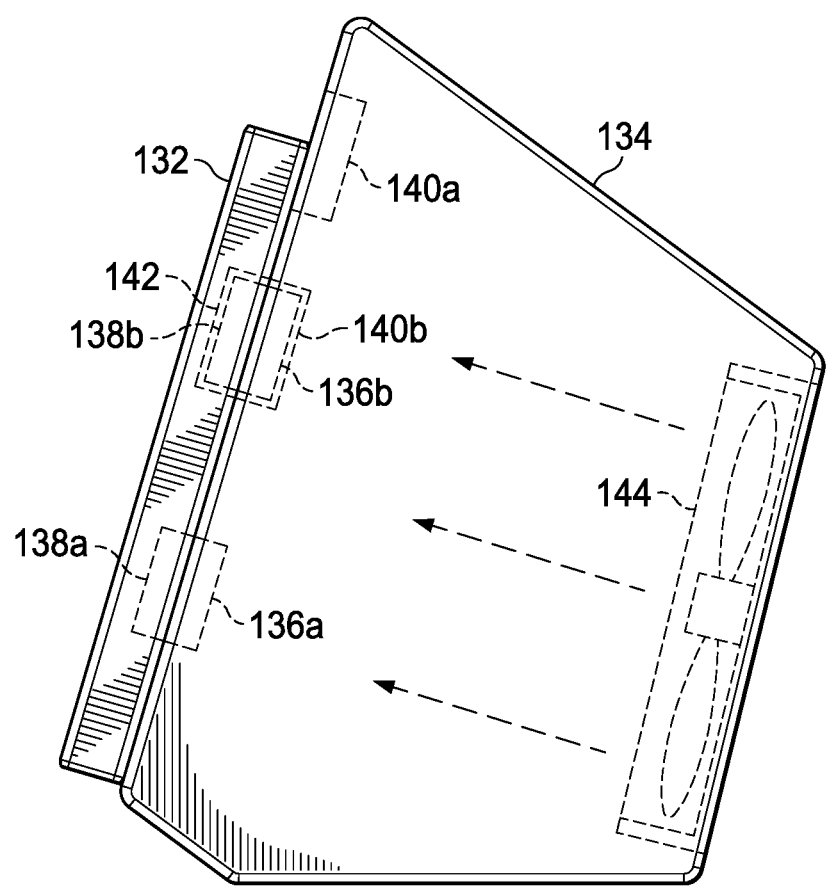
FIG. 10 is a simplified schematic diagram illustrating a side view of an embodiment of an electronic device with a docking station, in accordance with one embodiment of the present disclosure.

Turning to FIG. 10, FIG. 10 is a simplified side view illustrating an embodiment of device 132 coupled to stand 134 in a landscape configuration, in accordance with one embodiment of the present disclosure. Stand guides 136a and 136b can be configured to couple to device guides 138a and 38b and help secure device 132 to stand 134. Stand guides 136a and 136b can also be configured to couple to device guides 138a and 38b and help align PTU 140b with PRU 142 to allow for wireless charging of device 132. Cooling device 144 can be configured to cool device 132 when device 132 is coupled to stand 134.

Figure 11A:
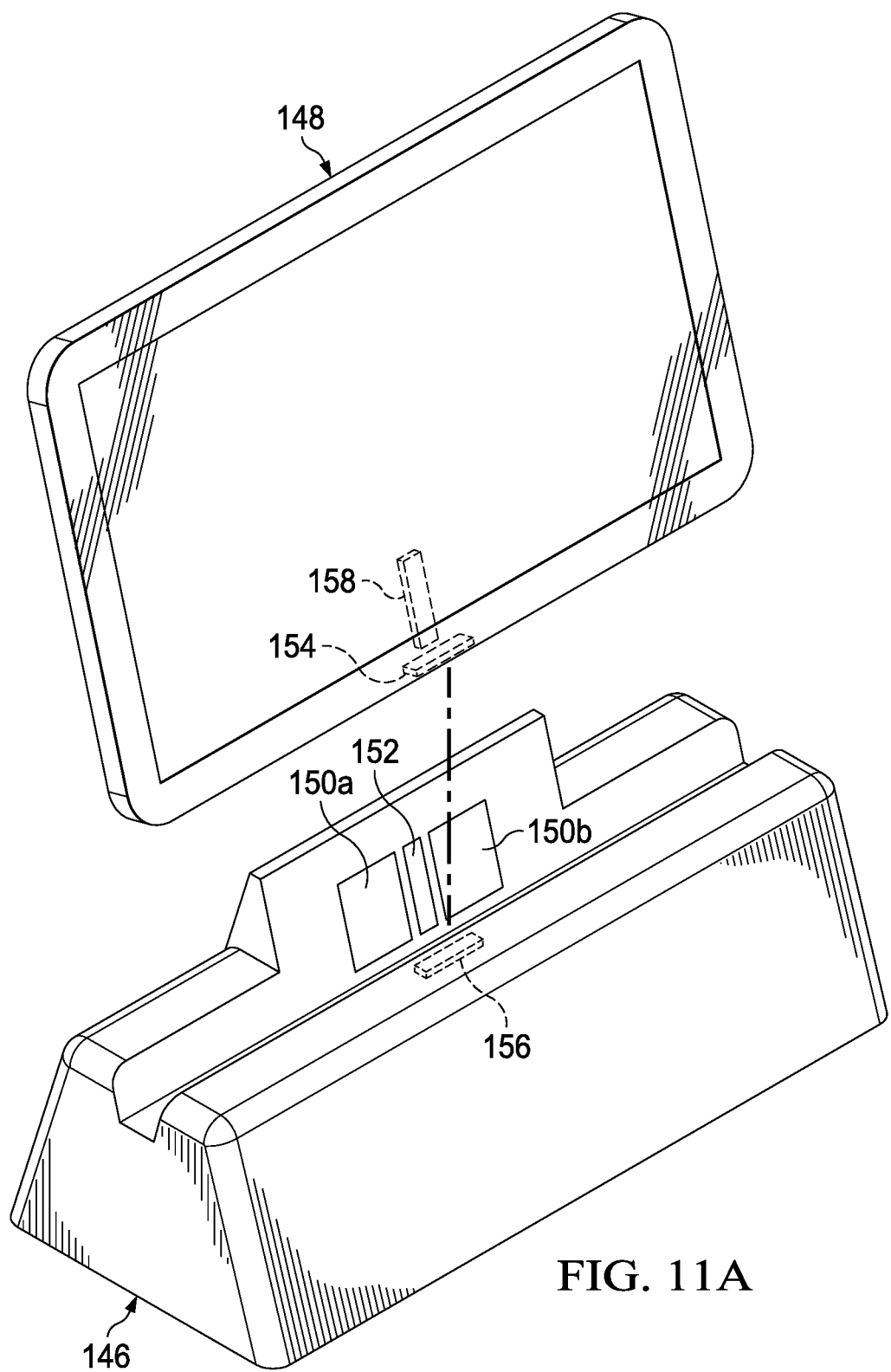
FIG. 11A is a simplified schematic diagram illustrating an orthogonal view of an embodiment of an electronic device with a docking station, in accordance with one embodiment of the present disclosure.

Turning to FIG. 11A, FIG. 11A is a simplified orthographic view illustrating an embodiment of coupling stand 146, in accordance with one embodiment of the present disclosure. Coupling stand 146 can include a one or more coupling guides 150a and 150b, a center coupling guide 152, and a stand interconnect 156. An electronic device 148 can include a device coupling guide 158 and a device interconnect 154. In an example, coupling guides 150a and 150b, center coupling guide 152, and device coupling guide 158 can include magnets.

In a specific example, the polarity of coupling guides 150a and 150b and device coupling guide 158 is the same while the polarity of center coupling guide 152 and device coupling guide 158 is opposite. When electronic device 148 is inserted into coupling stand 146, center coupling guide 152 and device coupling guide 158 are attracted to each other due to the opposite polarity and while coupling guides 150a and 150b and device coupling guide 158 are repulsive towards each other due to the same polarity. This helps align device interconnect 154 with stand interconnect 156 and facilitate proper coupling of coupling stand 146 and electronic device 148. Interconnects 156 and device interconnect 154 can be configured to couple coupling stand 146 and electronic device 148 and allow for the transfer of data and signals between coupling stand 146 and electronic device 148.

The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

Figure 11B:
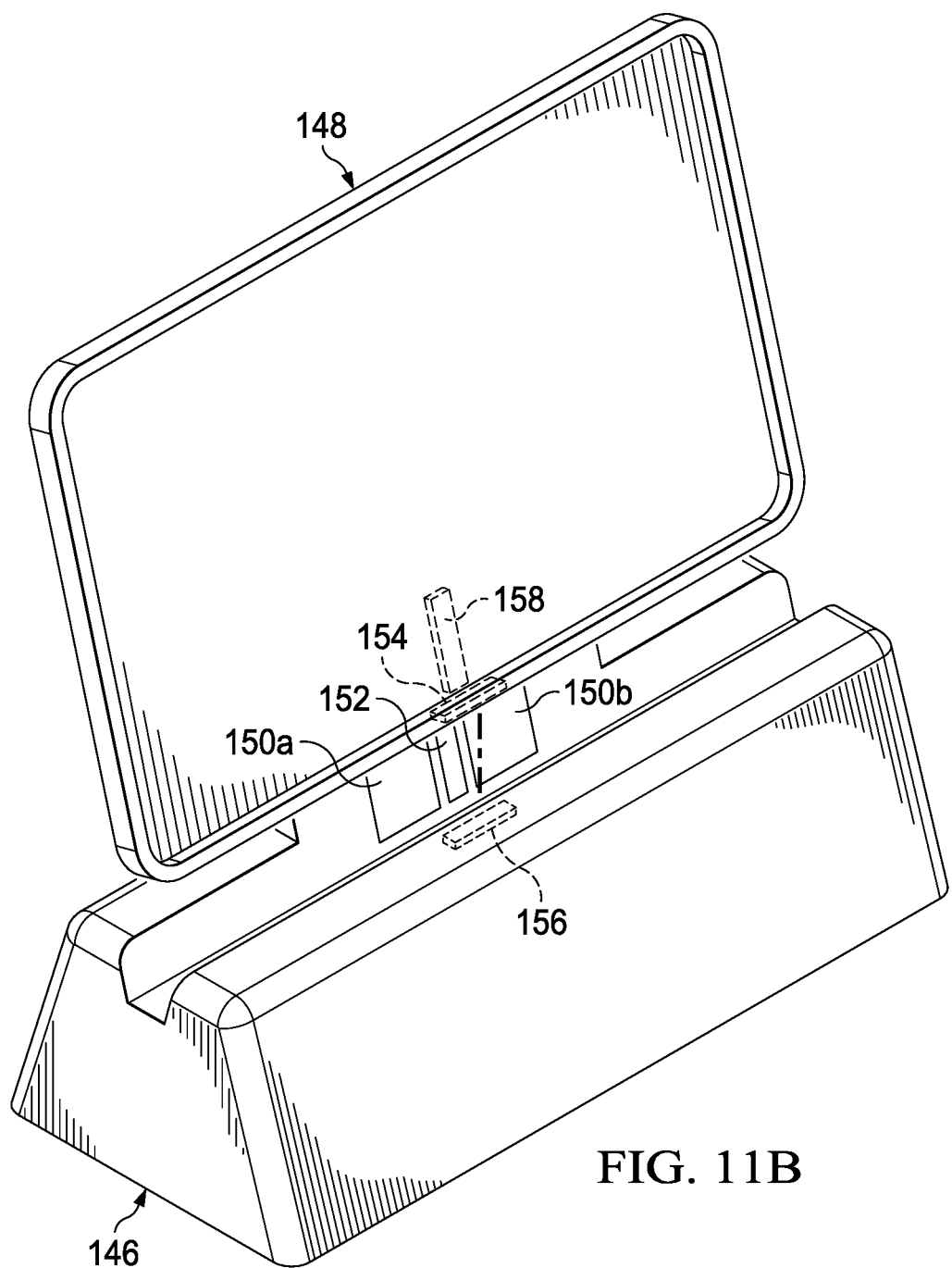
FIG. 11B is a simplified schematic diagram illustrating an orthogonal view of an embodiment of an electronic device with a docking station, in accordance with one embodiment of the present disclosure.
Figure 11C:
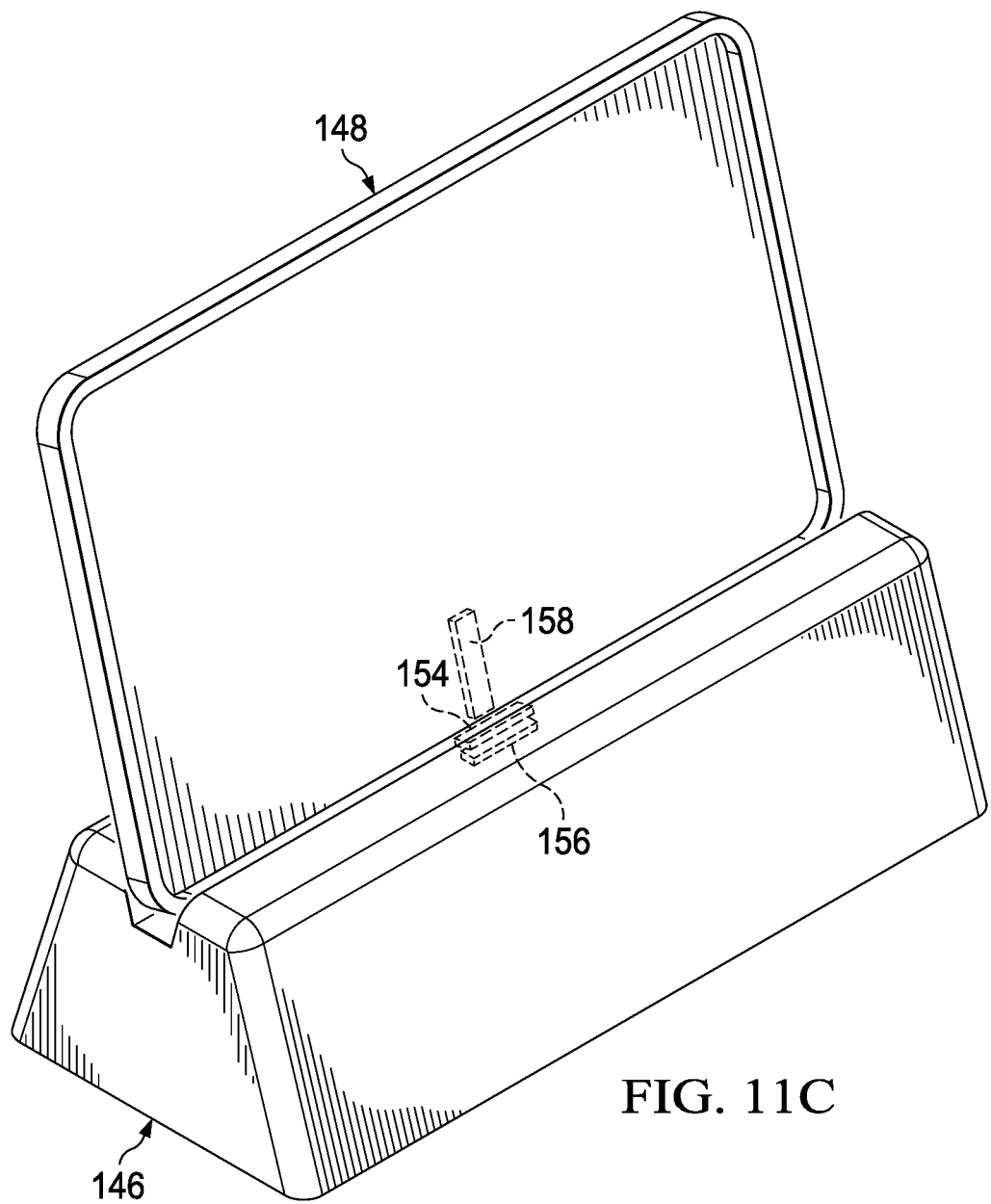
FIG. 11C is a simplified schematic diagram illustrating an orthogonal view of an embodiment of an electronic device with a docking station, in accordance with one embodiment of the present disclosure.

Turning to FIGS. 11B and 11C, FIGS. 11B and 11C are a simplified orthographic view illustrating an embodiment of electronic device 148 being coupled to coupling stand 146, in accordance with one embodiment of the present disclosure. As electronic device 148 is lowered to coupling stand 146, center coupling guide 152 and device coupling guide 158 are attracted to each other due to the opposite polarity and can help align device interconnect 154 with stand interconnect 156 and facilitate proper coupling of coupling stand 146 and electronic device 148. In addition, coupling guides 150a and 150b and device coupling guide 158 are repulsive towards each other due to the same polarity which can also help align device interconnect 154 with stand interconnect 156.

Figure 12:
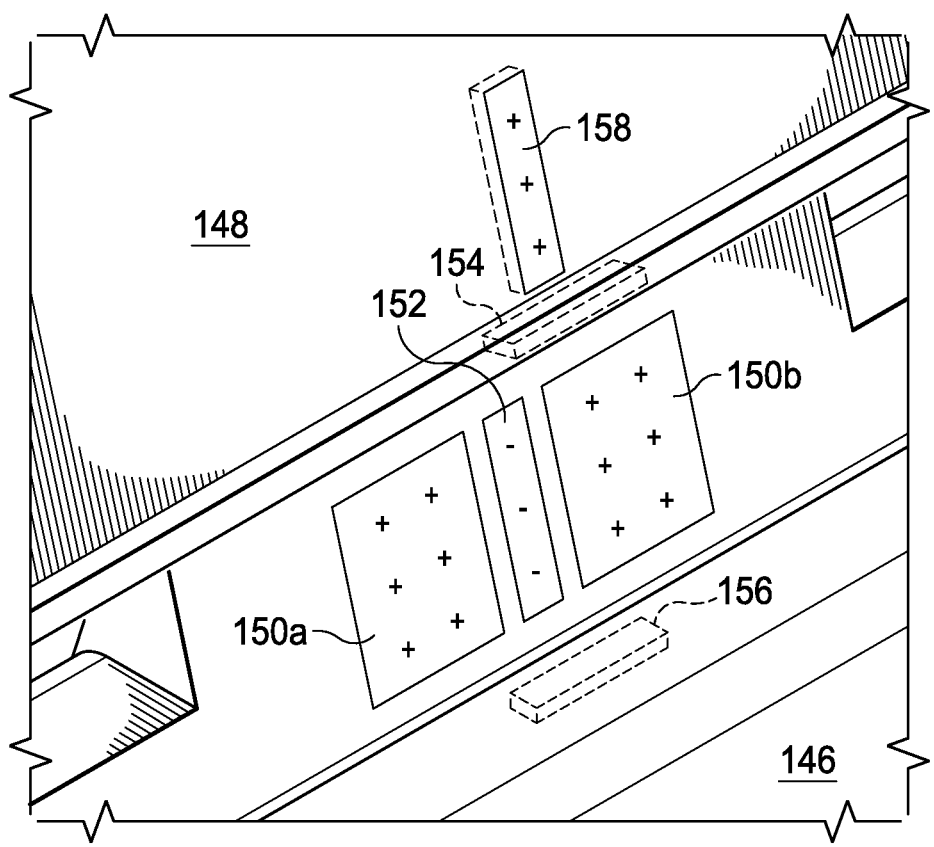
FIG. 12 is a simplified schematic diagram illustrating a plan view of an embodiment of a portion of an electronic device with a portion of a docking station, in accordance with one embodiment of the present disclosure.

Turning to FIG. 12, FIG. 12 is a simplified plan view illustrating an embodiment of a portion of electronic device 148 being coupled to coupling stand 146, in accordance with one embodiment of the present disclosure. As illustrated in FIG. 12, the polarity of coupling guides 150a and 150b and device coupling guide 158 is the same while the polarity of center coupling guide 152 and device coupling guide 158 is opposite. When electronic device 148 is inserted into coupling stand 146, center coupling guide 152 and device coupling guide 158 are attracted to each other due to the opposite polarity and while coupling guides 150a and 150b and device coupling guide 158 are repulsive towards each other due to the same polarity. This helps align device interconnect 154 with stand interconnect 156 and facilitate proper coupling of coupling stand 146 and electronic device 148. Note that while a positive or negative polarity is shown, this is for illustration purposes only.

Figure 13A:
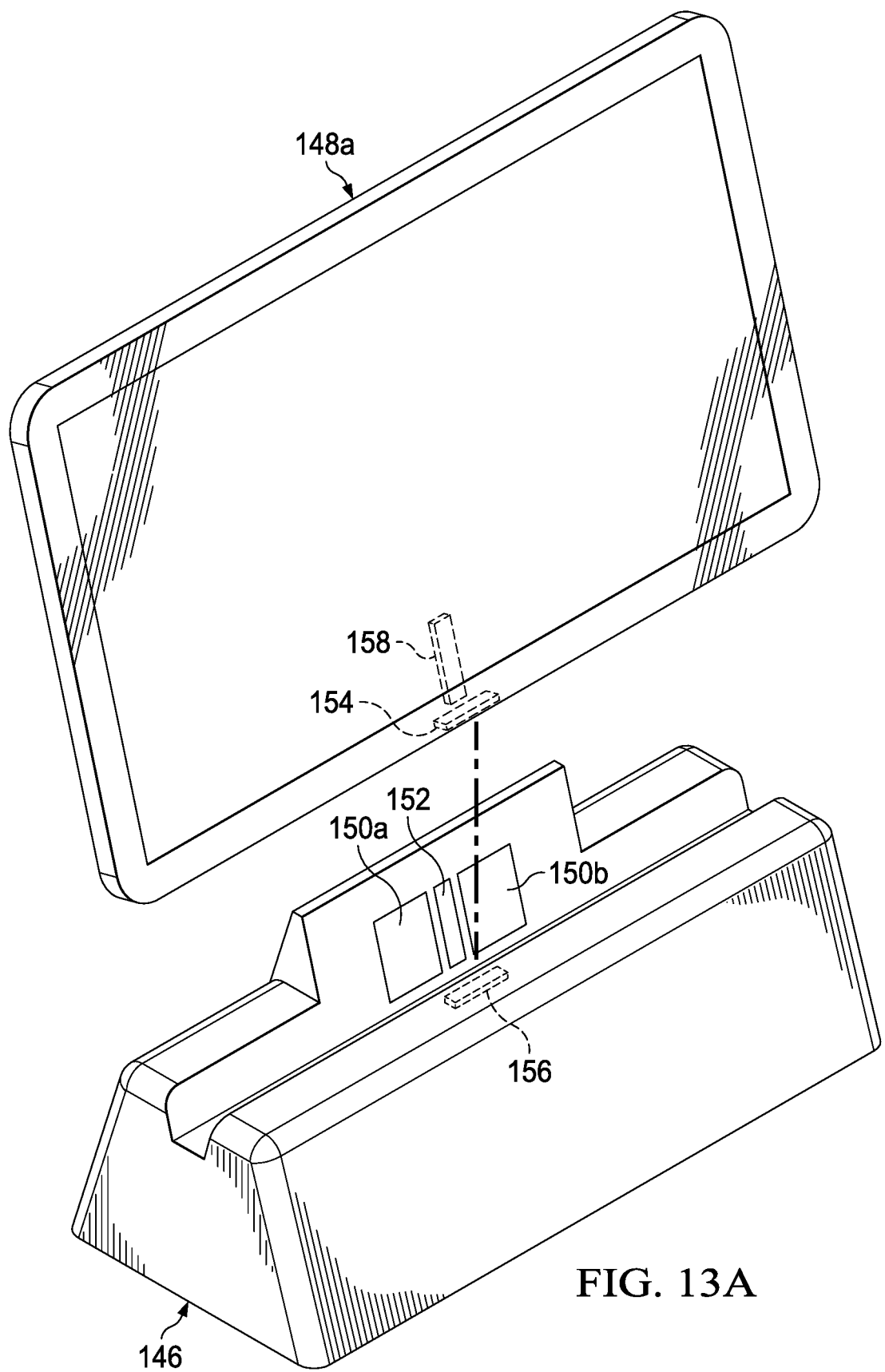
FIG. 13A is a simplified schematic diagram illustrating an orthogonal view of an embodiment of an electronic device with a docking station, in accordance with one embodiment of the present disclosure.
Figure 13B:
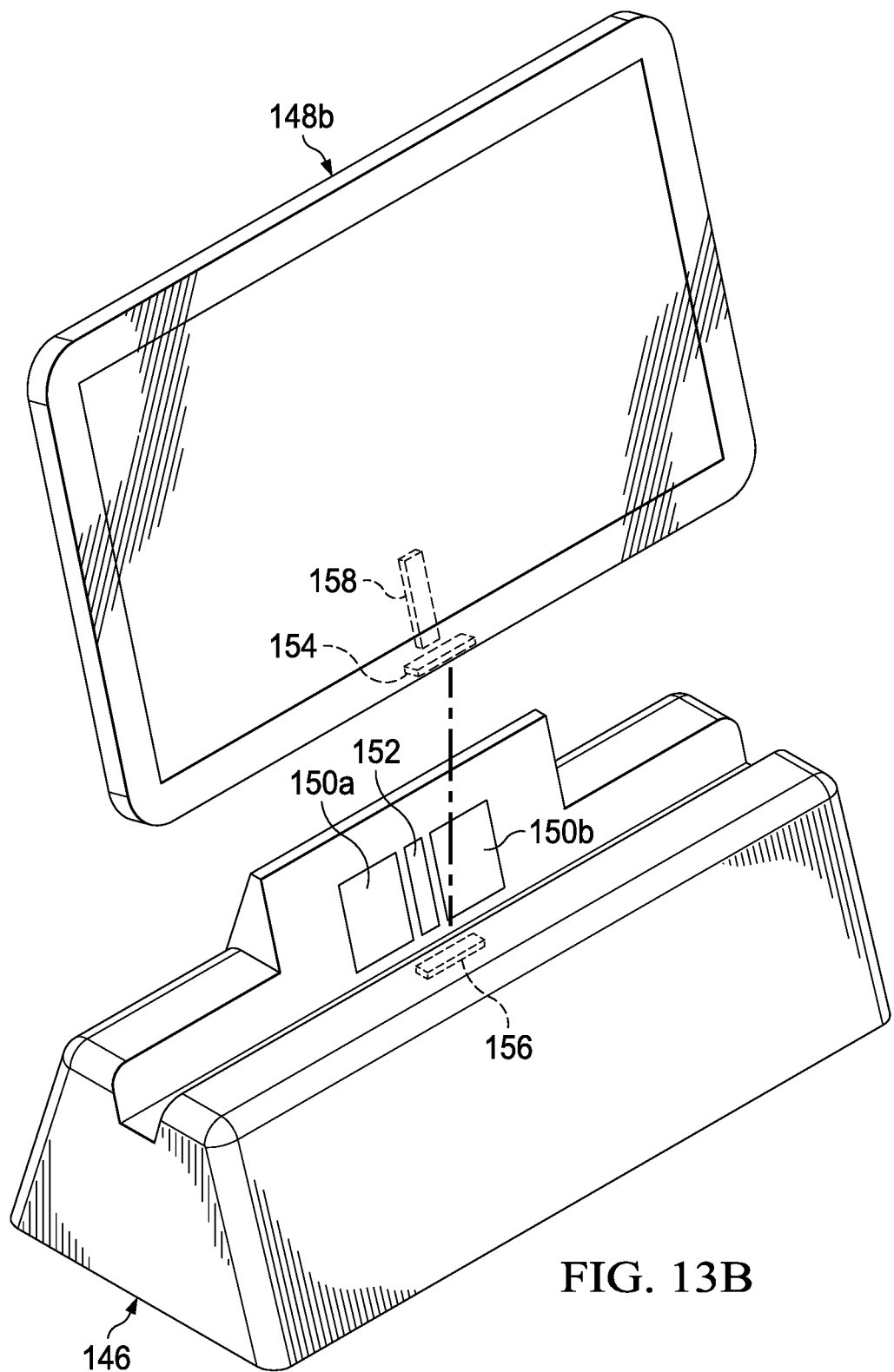
FIG. 13B is a simplified schematic diagram illustrating an orthogonal view of an embodiment of an electronic device with a docking station, in accordance with one embodiment of the present disclosure.
Figure 13C:
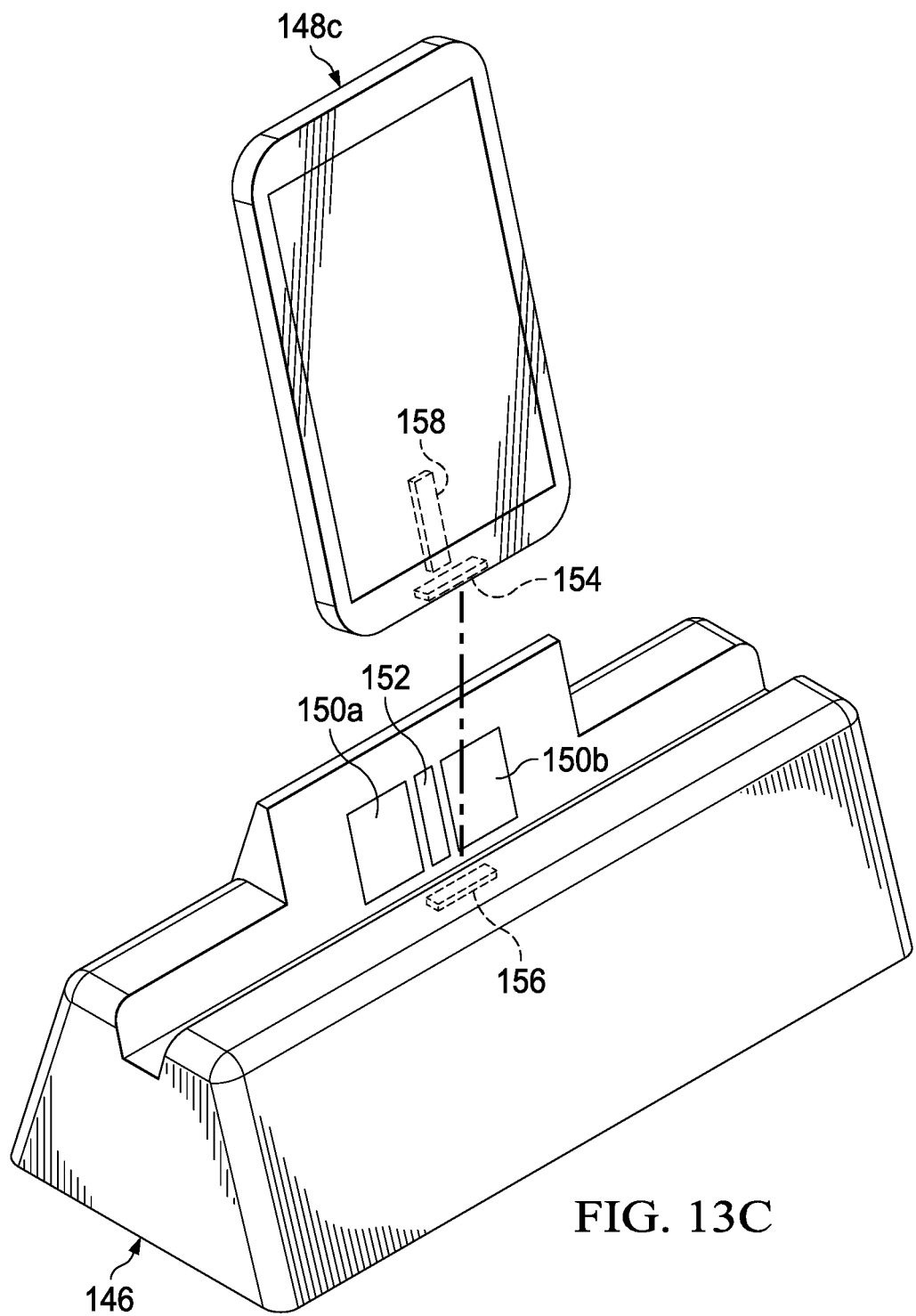
FIG. 13C is a simplified schematic diagram illustrating an orthogonal view of an embodiment of an electronic device with a docking station, in accordance with one embodiment of the present disclosure.

Turning to FIGS. 13A-13C, FIGS. 13A-13C are a simplified a orthogonal view illustrating an embodiment of different sized devices being coupled to coupling stand 146, in accordance with one embodiment of the present disclosure. For example, FIG. 13A shows a relatively large electronic device 148a being coupled to coupling stand 146, FIG. 13B shows a medium sized electronic device 148b being coupled to coupling stand 146, and FIG. 13C shows a relatively small electronic device 148c being coupled to coupling stand 146. In each case, when relatively large electronic device 148a, medium sized electronic device 148b, or relatively small electronic device 148c is inserted into coupling stand 146, center coupling guide 152 and device coupling guide 158 are attracted to each other due to the opposite polarity and while coupling guides 150a and 150b and device coupling guide 158 are repulsive towards each other due to the same polarity. This helps align device interconnect 154 with stand interconnect 156 and facilitate proper coupling of coupling stand 146 and relatively large electronic device 148a, medium sized electronic device 148b, or relatively small electronic device 148c, regardless of their size.

Figure 14A:
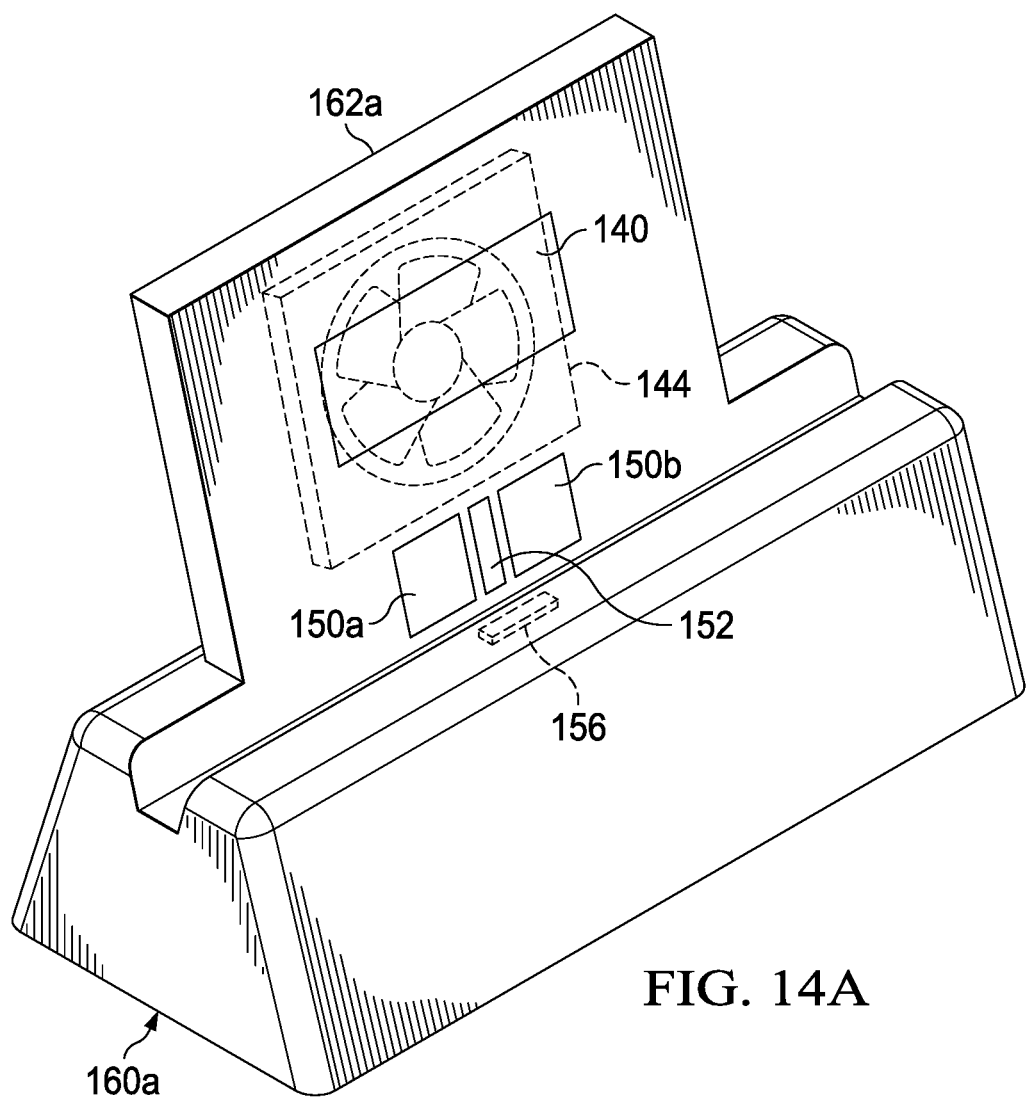
FIG. 14A is a simplified schematic diagram illustrating an orthogonal view of an embodiment of a docking station, in accordance with one embodiment of the present disclosure.

Turning to FIG. 14A, FIG. 14A is a simplified an orthogonal view illustrating an embodiment of a wireless charging docking station 160a, in accordance with one embodiment of the present disclosure. Wireless charging docking station 160a can include PTU 140, cooling device 144, coupling guides 150a and 150b, center coupling guide 152, and stand interconnect 156. PTU 140 and cooling device 144 may be located on a device support section 162a of wireless charging docking station 160a.

Figure 14B:
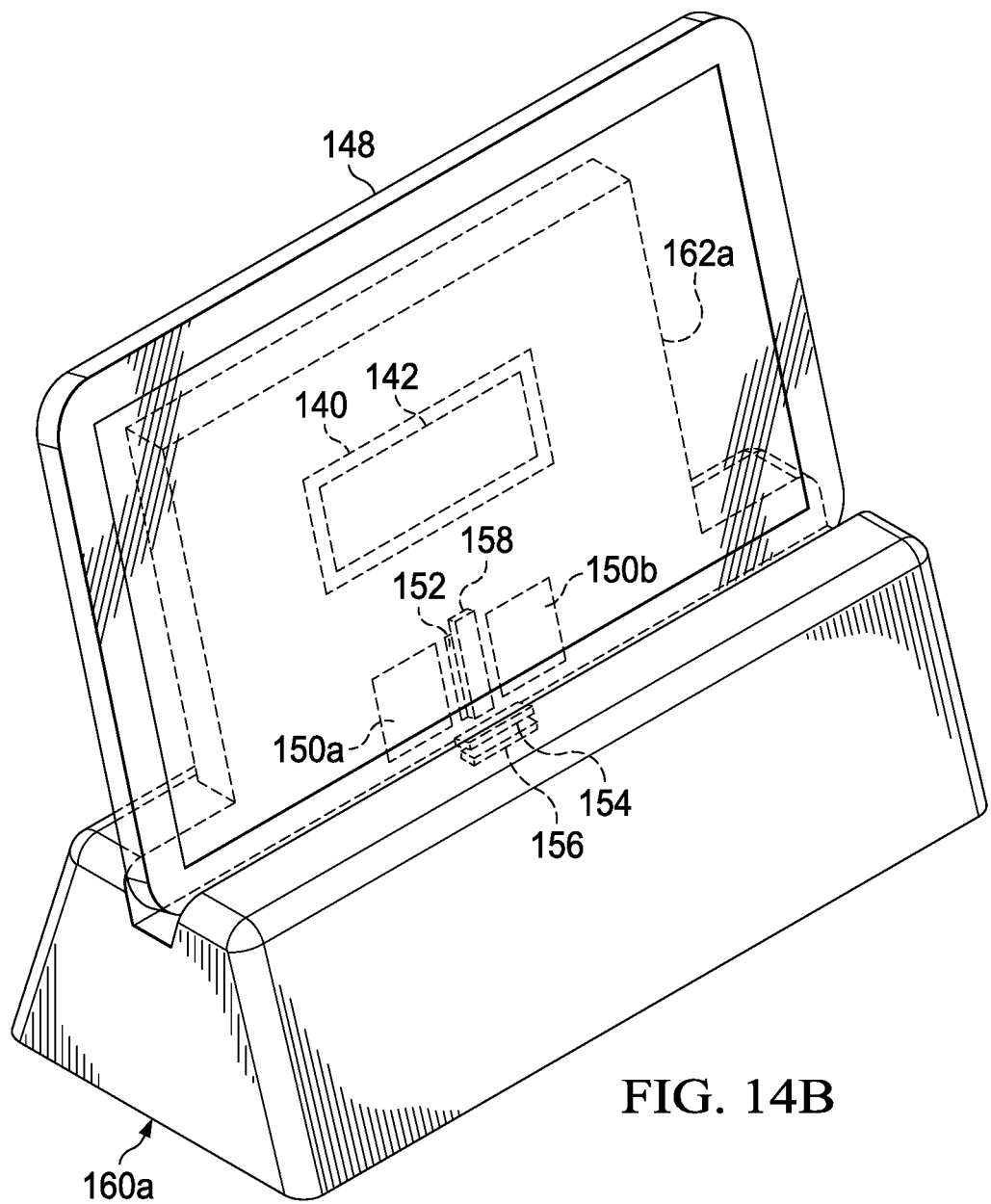
FIG. 14B is a simplified schematic diagram illustrating an orthogonal view of an embodiment of an electronic device with a docking station, in accordance with one embodiment of the present disclosure.

Turning to FIG. 14B, FIG. 14B is a simplified an orthogonal view illustrating an embodiment of electronic device 148 coupled to wireless charging docking station 160*a*, in accordance with one embodiment of the present disclosure. When electronic device 148 is inserted into coupling wireless charging docking station 160*a*, coupling guides 150*a* and 150*b*, center coupling guide 152, and device coupling guide 158 can help align device interconnect 154 with stand interconnect 156 and facilitate proper coupling of electronic device 148 and wireless charging docking station 160*a*. In addition, coupling guides 150*a* and 150*b*, center coupling guide 152, and device coupling guide 158 can help align PTU 140 and PRU 142 to help facilitate wireless charging of electronic device 148.

Figure 15:
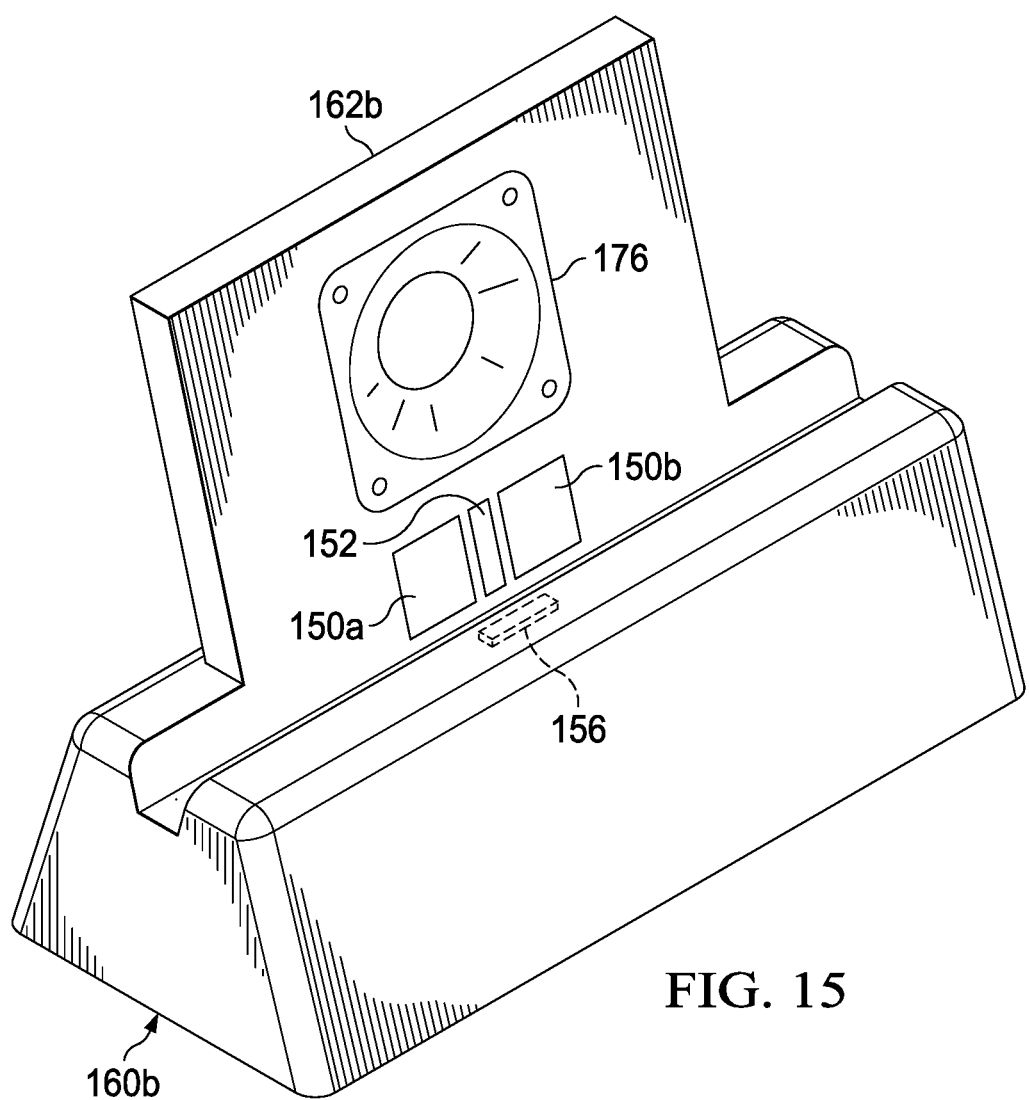
FIG. 15 is a simplified schematic diagram illustrating an orthogonal view of an embodiment of a docking station, in accordance with one embodiment of the present disclosure.

Turning to FIG. 15, FIG. 15 is a simplified an orthogonal view illustrating an embodiment of a wireless charging docking station 160*b*, in accordance with one embodiment of the present disclosure. Wireless charging docking station 160*b* can include coupling guides 150*a* and 150*b*, center coupling guide 152, stand interconnect 156, and an audio source 176. Audio source 176 may be located on device support section 162*b* of wireless charging docking station 160*b*. Audio source 176 can be configured to play audio from a device connected to wireless charging docking station 160*b*.

Figure 16A:
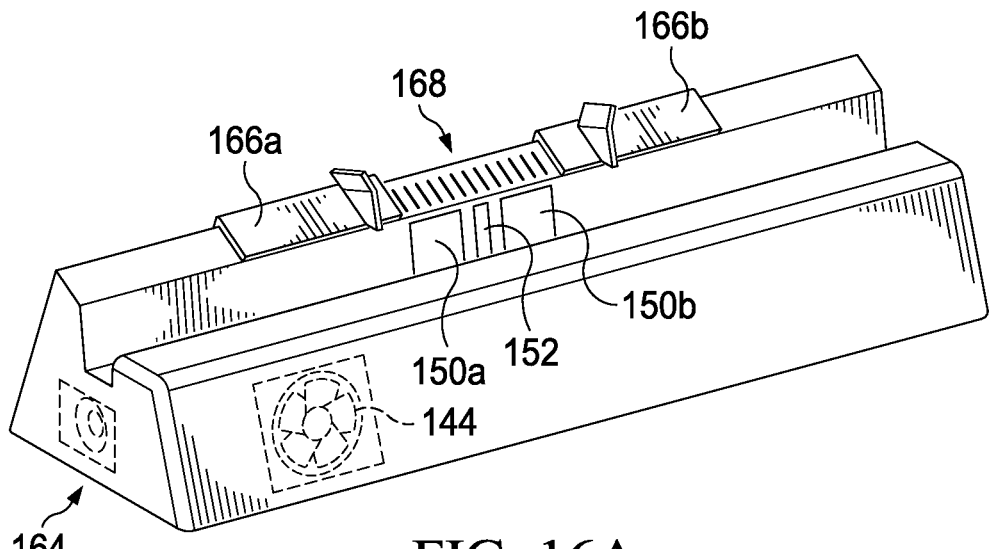
FIG. 16A is a simplified schematic diagram illustrating an orthogonal view of an embodiment of a docking station, in accordance with one embodiment of the present disclosure.

Turning to FIG. 16A, FIG. 16A is a simplified an orthogonal view illustrating an embodiment of a docking station 164, in accordance with one embodiment of the present disclosure. Docking station 164 can include cooling device 144, coupling guides 150*a* and 150*b*, center coupling guide 152, guides 166*a* and 166*b*, and cooling vents 168. Guides 166*a* and 166*b* can help guide a device into proper alignment for coupling with docking station 164. Cooling vents 168 can channel airflow from cooling device 144 when cooling device 144 is a fan and guides 166*a* and 166*b* can help block airflow from cooling vents 168 so the airflow is channeled more effectively over a device coupled to docking station 164.

Figure 16B:
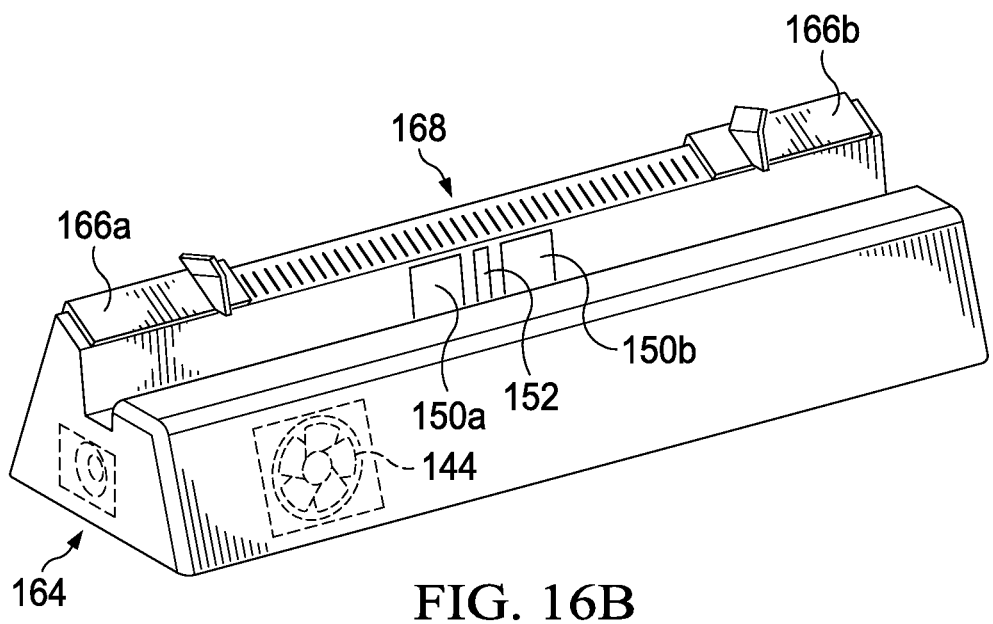
FIG. 16B is a simplified schematic diagram illustrating an orthogonal view of an embodiment of a docking station, in accordance with one embodiment of the present disclosure.

Turning to FIG. 16B, FIG. 16B is a simplified an orthogonal view illustrating an embodiment of docking station 164, in accordance with one embodiment of the present disclosure. Guides 166*a* and 166*b* can move from a closed position illustrated in FIG. 16A to an extended or open position as illustrated in FIG. 16B. Guides 166*a* and 166*b* can help guide different devices with different widths into proper alignment for coupling with docking station 164.

Figure 17A:
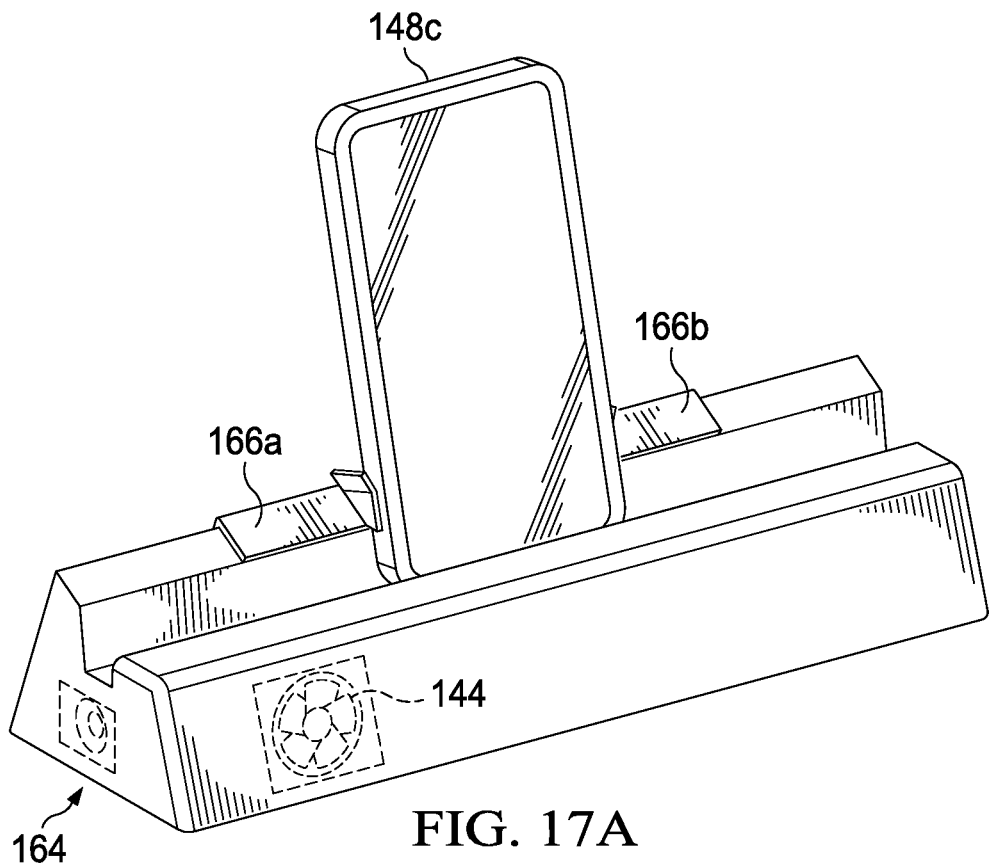
FIG. 17A is a simplified schematic diagram illustrating an orthogonal view of an embodiment of an electronic device with a docking station, in accordance with one embodiment of the present disclosure.

Turning to FIG. 17A, FIG. 17A is a simplified an orthogonal view illustrating an embodiment of docking station 164, in accordance with one embodiment of the present disclosure. Guides 166*a* and 166*b* can help guide electronic device 148*c* (e.g., a device with a relatively small width) into proper alignment for coupling with docking station 164. Cooling vents 168 (not shown) can channel airflow from cooling device 144 when cooling device 144 is a fan and help cool electronic device 148*c*. Because of the relatively small size of electronic device 148*c*, guides 166*a* and 166*b* can help block a portion of cooling vents 168 to channel airflow to electronic device 148*c*.

Figure 17B:
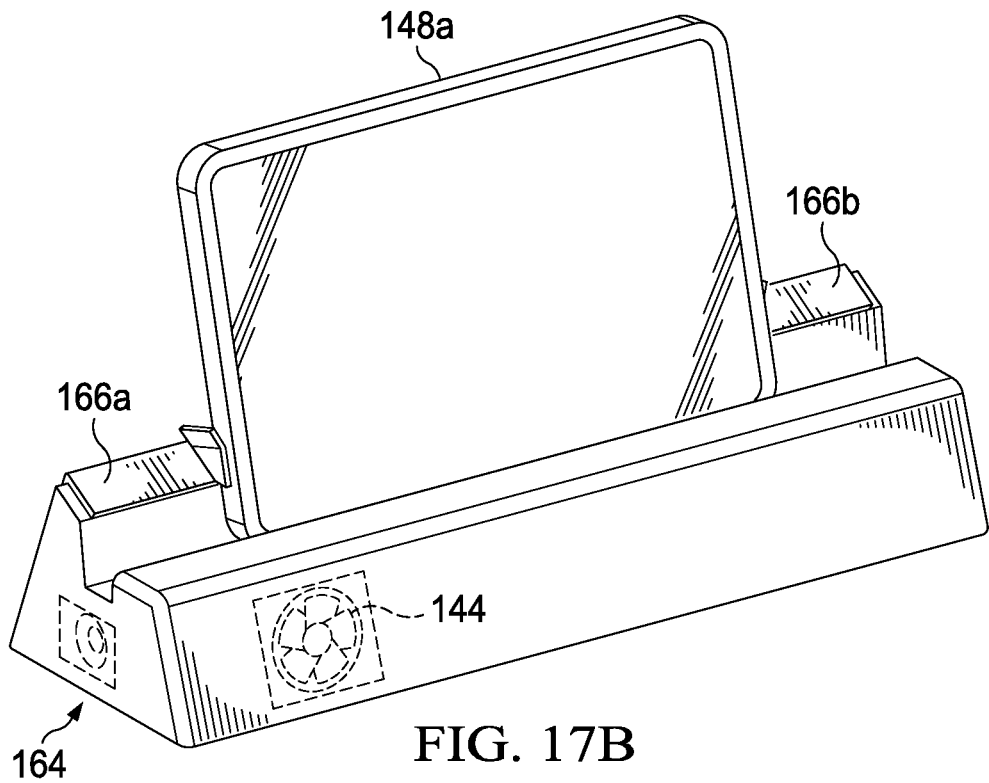
FIG. 17B is a simplified schematic diagram illustrating an orthogonal view of an embodiment of an electronic device with a docking station, in accordance with one embodiment of the present disclosure.

Turning to FIG. 17B, FIG. 17B is a simplified an orthogonal view illustrating an embodiment of docking station 164, in accordance with one embodiment of the present disclosure. Guides 166*a* and 166*b* can help guide electronic device 148*a* (e.g., a device with a relatively large width) into proper alignment for coupling with docking station 164. Cooling vents 168 (not shown) can channel airflow from cooling device 144 when cooling device 144 is a fan and help electronic cool device 148*a*.

Figure 18A:
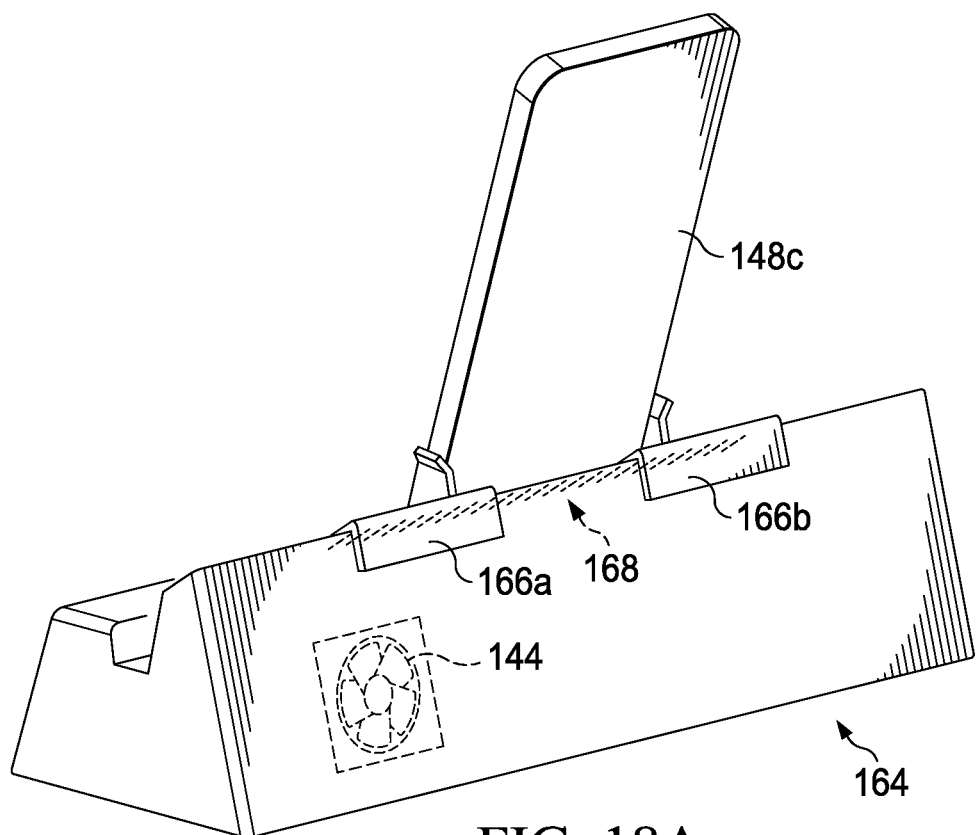
FIG. 18A is a simplified schematic diagram illustrating an orthogonal view of an embodiment of an electronic device with a docking station, in accordance with one embodiment of the present disclosure.

Turning to FIG. 18A, FIG. 18A is a simplified a orthogonal view illustrating an embodiment of docking station 164, in accordance with one embodiment of the present disclosure. Cooling vents 168 can channel airflow from cooling device 144 when cooling device 144 is a fan and help cool electronic device 148*c*. As illustrated in FIG. 18A, guides 166*a* and 166*b* can be configured to conform to the profile of electronic device 148*c* such that the area of cooling vents 168 where airflow is channeled about the same area as the width of electronic device 148*c*.

Figure 18B:
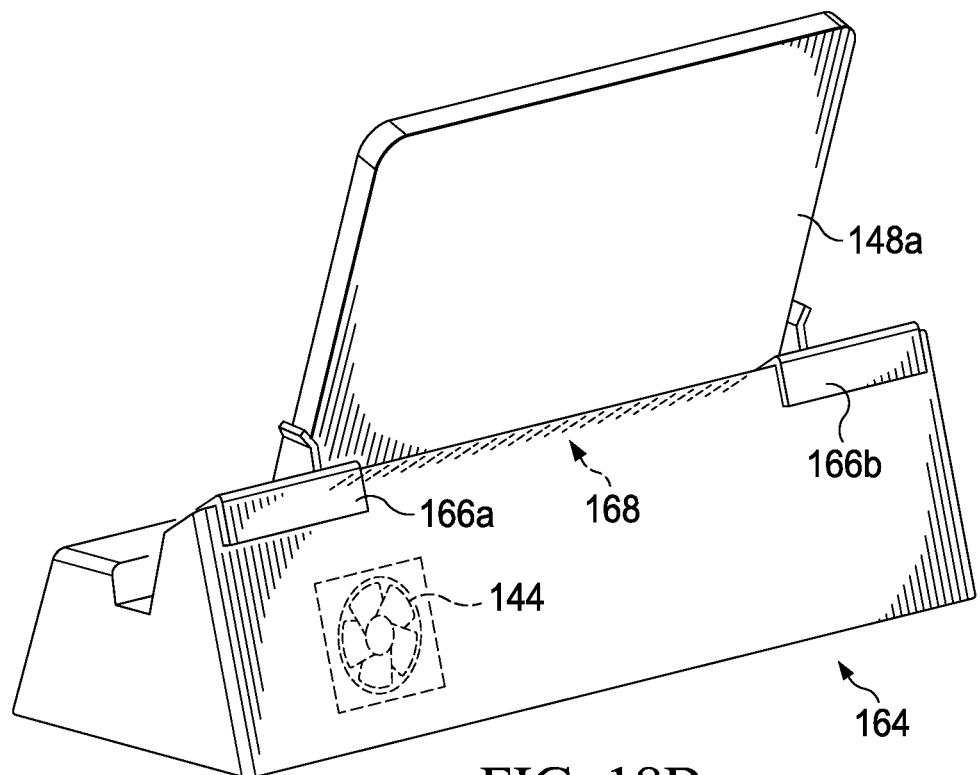
FIG. 18B is a simplified schematic diagram illustrating an orthogonal view of an embodiment of an electronic device with a docking station, in accordance with one embodiment of the present disclosure.

Turning to FIG. 18B, FIG. 18B is a simplified an orthogonal view illustrating an embodiment of docking station 164, in accordance with one embodiment of the present disclosure. Cooling vents 168 can channel airflow from cooling device 144 when cooling device 144 is a fan and help cool electronic device 148*a*. As illustrated in FIG. 18B, guides 166*a* and 166*b* can be configured to conform to the profile of electronic device 148*a* such that the area of cooling vents 168 where airflow exists is about the same area as the width of electronic device 148*a*.

Figure 18C:
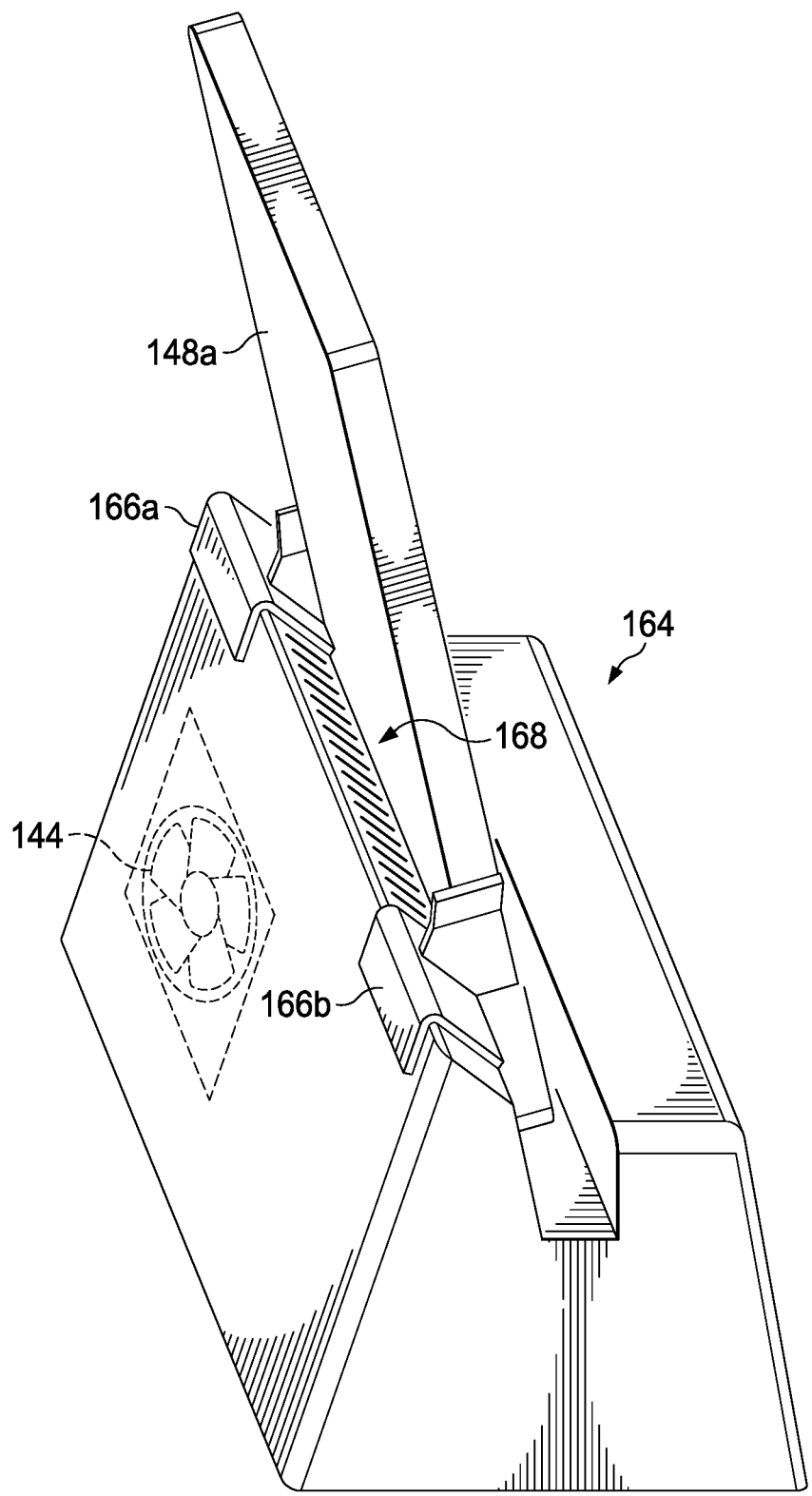
FIG. 18C is a simplified schematic diagram illustrating an orthogonal view of an embodiment of an electronic device with a docking station, in accordance with one embodiment of the present disclosure.

Turning to FIG. 18C, FIG. 18C is a simplified an orthogonal view illustrating an embodiment of docking station 164, in accordance with one embodiment of the present disclosure. Cooling vents 168 can channel airflow from cooling device 144 when cooling device 144 is a fan and help cool electronic device 148*a*. As illustrated in FIG. 18C, cooling vents 168 can have an angled profile towards the back of electronic device 148*a*. This profile can allow air from cooling device 144 to be focused on the back of electronic device 148*a*.

Figure 19A:
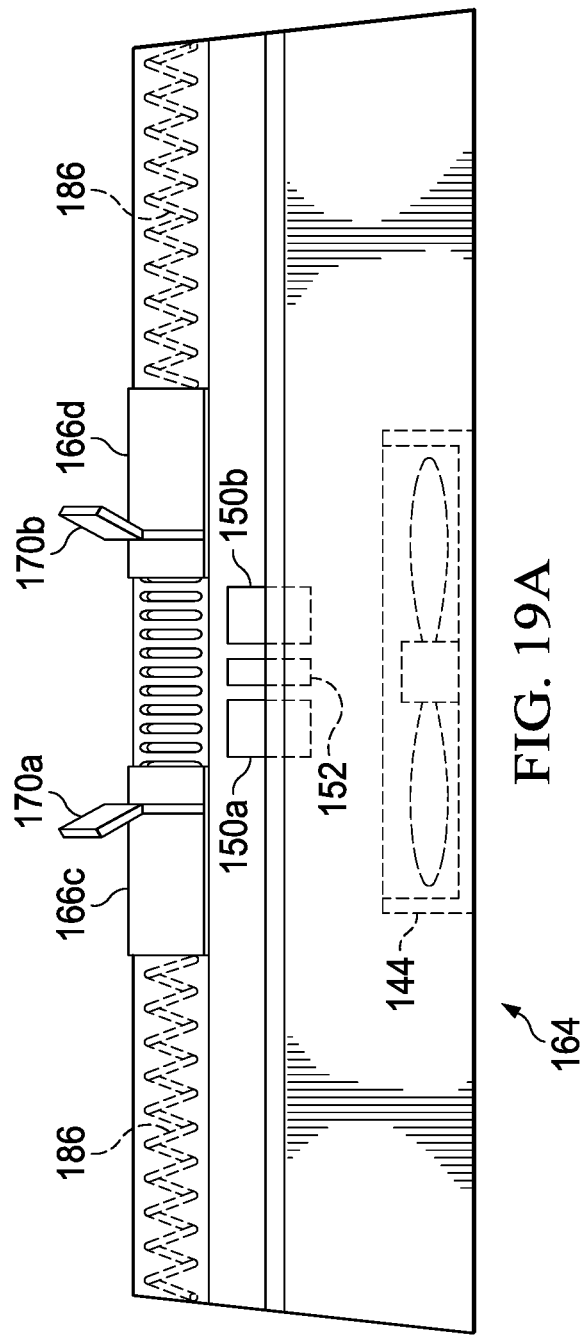
FIG. 19A is a simplified schematic diagram illustrating a plan view of an embodiment of a docking station, in accordance with one embodiment of the present disclosure.

Turning to FIG. 19A, FIG. 19A is a simplified a plan view illustrating an embodiment of docking station 164, in accordance with one embodiment of the present disclosure. Docking station 164 can include cooling device 144, coupling guides 150*a* and 150*b*, center coupling guide 152, guides 166*c* and 166*d*, and tension mechanisms 186. Guides 166*c* and 166*d* can include extensions 170*a* and 170*b* respectively.

Extensions 170*a* and 170*b* can help align a device with guides 166*a* and 166*d* to help guide a device into proper alignment for coupling with docking station 164. Tension mechanisms 186 can exert a small force on guides 166*c* and 166*d* that pushes or otherwise directs them towards a center portion of docking station 164. The small force can help keep a device near the center of docking station 164 and help guide a device into proper alignment for coupling with docking station 164.

Figure 19B:
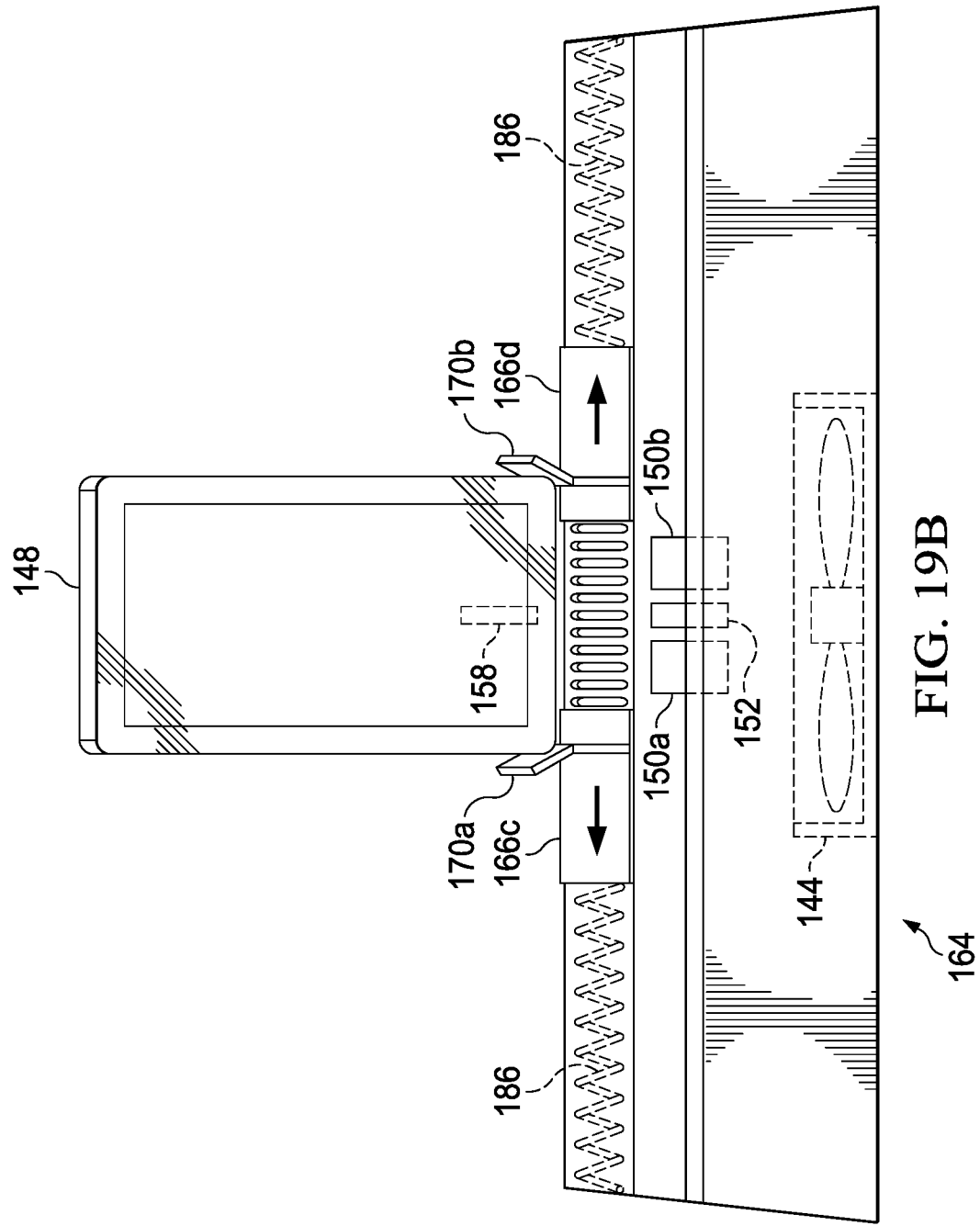
FIG. 19B is a simplified schematic diagram illustrating a plan view of an embodiment of an electronic device with a docking station, in accordance with one embodiment of the present disclosure.

Turning to FIG. 19B, FIG. 19B is a simplified a plan view illustrating an embodiment of docking station 164, in accordance with one embodiment of the present disclosure. As illustrated in FIG. 19B, as electronic device 148 is lowered into docking station 164, extensions 170*a* and 170*b* can help guide electronic device 148 towards the center of docking station 164. Tension mechanism 186 can exert a small force that keeps extensions 170*a* and 170*b* pressed against electronic device 148.

Turning to FIG. 19C, FIG. 19C is a simplified a plan view illustrating an embodiment of docking station 164, in accordance with one embodiment of the present disclosure. As illustrated in FIG. 19C, as electronic device 148 is lowered into docking station 164, extensions 170*a* and 170*b* and guides 166*c* and 166*d* have helped guide electronic device 148 towards the center of docking station 164. As electronic device 148 is lowered onto docking station 164, tension mechanism 186 can exert a small force that keeps guides 166*c* and 166*d* pressed against electronic device 148 to help guide a device into proper alignment for coupling with docking station 164.

Figure 20:
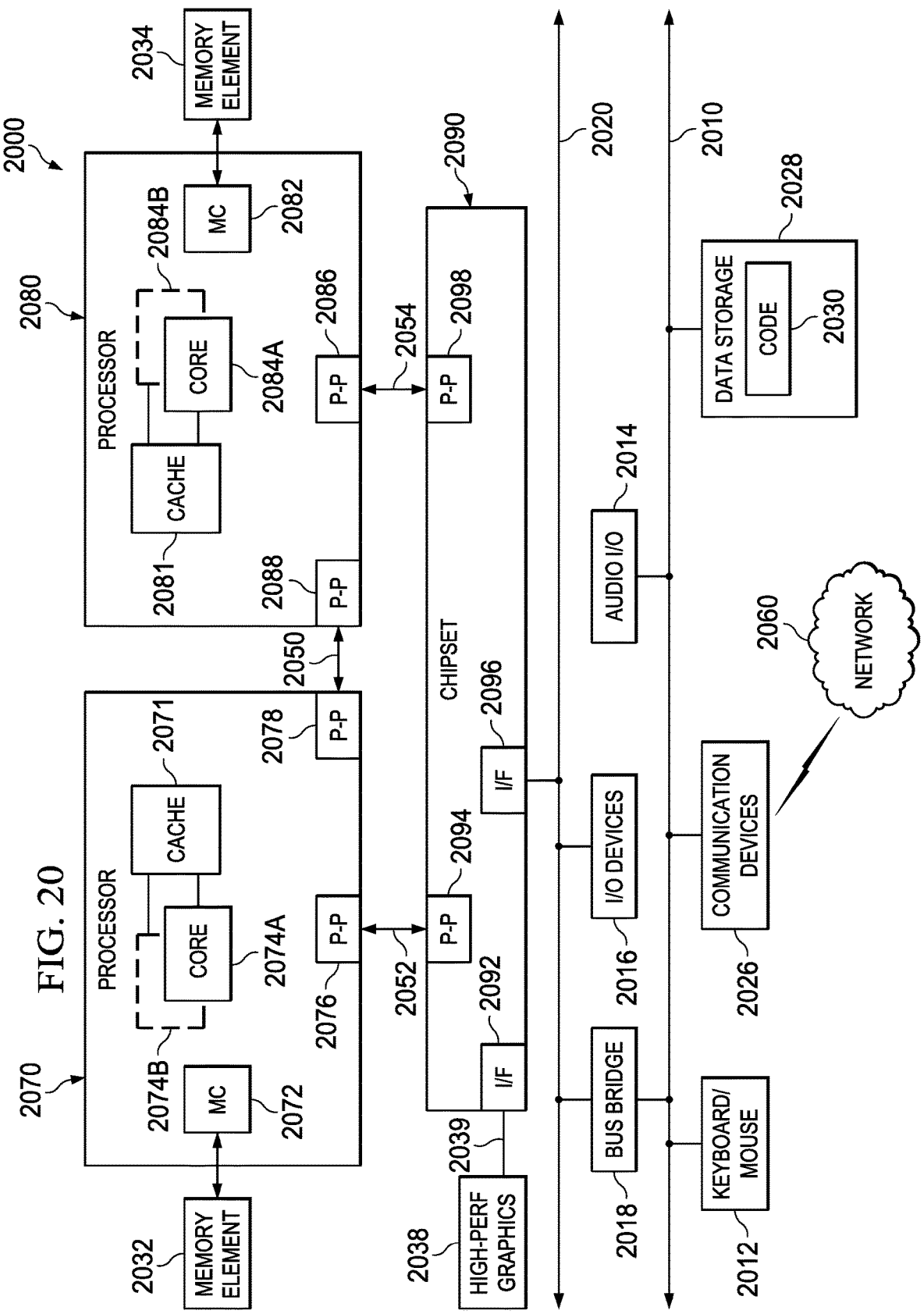
FIG. 20 is a block diagram illustrating an example computing system that is arranged in a point-to-point configuration in accordance with an embodiment.

Turning to FIG. 20, FIG. 20 illustrates a computing system 2000 that is arranged in a point-to-point (PtP) configuration according to an embodiment. In particular, FIG. 20 shows a system where processors, memory, and input/output devices are interconnected by a number of point-to-point interfaces. Generally, one or more of the electronic elements disclosed herein may be configured in the same or similar manner as computing system 2000.

As illustrated in FIG. 20, system 2000 may include several processors, of which only two, processors 2070 and 2080, are shown for clarity. While two processors 2070 and 2080 are shown, it is to be understood that an embodiment of system 2000 may also include only one such processor. Processors 2070 and 2080 may each include a set of cores (i.e., processor cores 2074A and 2074B and processor cores 2084A and 2084B) to execute multiple threads of a program. The cores may be configured to execute instruction code in a manner similar to that discussed above with reference to FIGS. 1-19C. Each processor 2070, 2080 may include at least one shared cache 2071, 2081. Shared caches 2071, 2081 may store data (e.g., instructions) that are utilized by one or more components of processors 2070, 2080, such as processor cores 2074 and 2084.

Processors 2070 and 2080 may also each include integrated memory controller logic (MC) 2072 and 2082 to communicate with memory elements 2032 and 2034. Memory elements 2032 and/or 2034 may store various data used by processors 2070 and 2080. In alternative embodiments, memory controller logic 2072 and 2082 may be discrete logic separate from processors 2070 and 2080.

Processors 2070 and 2080 may be any type of processor and may exchange data via a point-to-point (PtP) interface 2050 using point-to-point interface circuits 2078 and 2088, respectively. Processors 2070 and 2080 may each exchange data with a chipset 2090 via individual point-to-point interfaces 2052 and 2054 using point-to-point interface circuits 2076, 2086, 2094, and 2098. Chipset 2090 may also exchange data with a high-performance graphics circuit 2038 via a high-performance graphics interface 2039, using an interface circuit 2092, which could be a PtP interface circuit. In alternative embodiments, any or all of the PtP links illustrated in FIG. 20 could be implemented as a multi-drop bus rather than a PtP link.

Chipset 2090 may be in communication with a bus 2020 via an interface circuit 2096. Bus 2020 may have one or more devices that communicate over it, such as a bus bridge 2018 and I/O devices 2016. Via a bus 2010, bus bridge 2018 may be in communication with other devices such as a keyboard/mouse 2012 (or other input devices such as a touch screen, trackball, etc.), communication devices 2026 (such as modems, network interface devices, or other types of communication devices that may communicate through a computer network 2060), audio I/O devices 2014, and/or a data storage device 2028. Data storage device 2028 may store code 2030, which may be executed by processors 2070 and/or 2080. In alternative embodiments, any portions of the bus architectures could be implemented with one or more PtP links.

The computer system depicted in FIG. 20 is a schematic illustration of an embodiment of a computing system that may be utilized to implement various embodiments discussed herein. It will be appreciated that various components of the system depicted in FIG. 20 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 21:
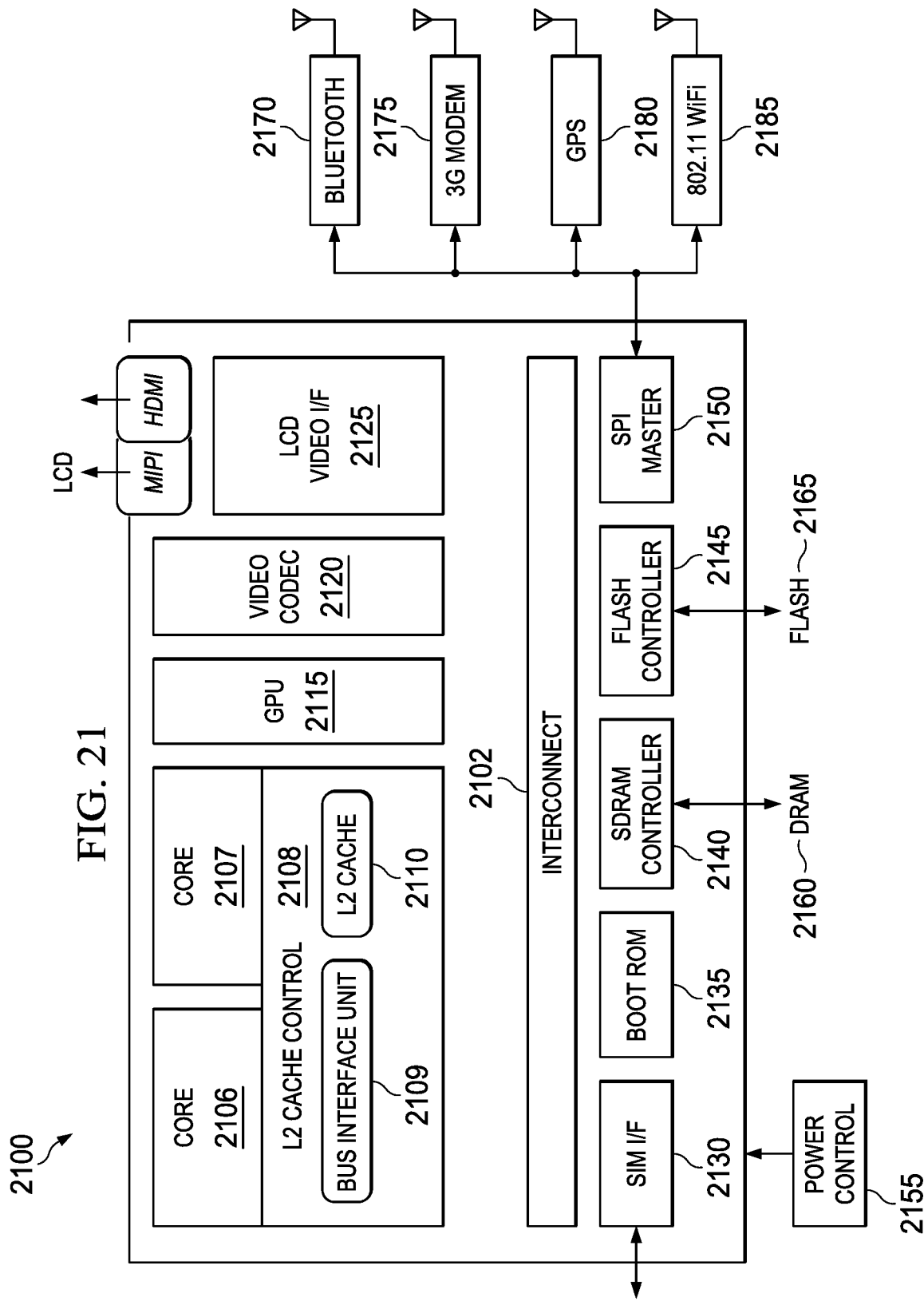
FIG. 21 is a simplified block diagram associated with an example ARM ecosystem system on chip (SOC) of the present disclosure.

Turning to FIG. 21, FIG. 21 is a simplified block diagram associated with an example ARM ecosystem SOC 2100 of the present disclosure. At least one example implementation of the present disclosure can include the docking station features discussed herein and an ARM component. For example, the example of FIG. 21 can be associated with any ARM core (e.g., A-7, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 21, ARM ecosystem SOC 2100 may include multiple cores 2106-2107, an L2 cache control 2108, a bus interface unit 2109, an L2 cache 2110, a graphics processing unit (GPU) 2115, an interconnect 2102, a video codec 2120, and a liquid crystal display (LCD) I/F 2125, which may be associated with mobile industry processor interface (MIPI)/high-definition multimedia interface (HDMI) links that couple to an LCD.

ARM ecosystem SOC 2100 may also include a subscriber identity module (SIM) I/F 2130, a boot read-only memory (ROM) 2135, a synchronous dynamic random access memory (SDRAM) controller 2140, a flash controller 2145, a serial peripheral interface (SPI) master 2150, a suitable power control 2155, a dynamic RAM (DRAM) 2160, and flash 2165. In addition, one or more example embodiments include one or more communication capabilities, interfaces, and features such as instances of Bluetooth™ 2170, a 3G modem 2175, a global positioning system (GPS) 2180, and an 802.11 Wi-Fi 2185.

In operation, the example of FIG. 21 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 22:
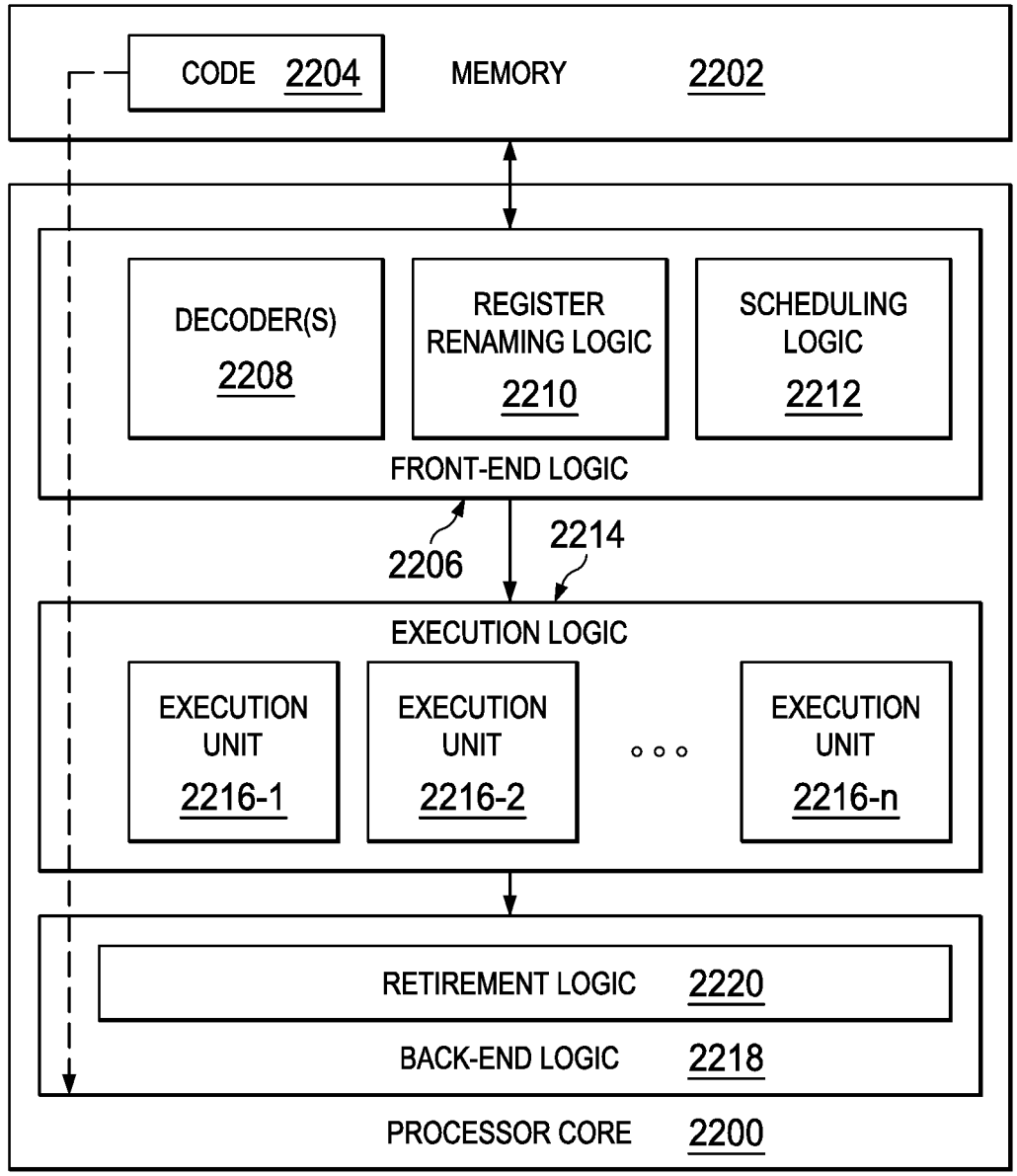
FIG. 22 is a block diagram illustrating an example processor core in accordance with an embodiment.

FIG. 22 illustrates a processor core 2200 according to an embodiment. Processor core 2200 may be the core for any type of processor, such as a micro-processor, an embedded processor, a digital signal processor (DSP), a network processor, or other device to execute code. Although only one processor core 2200 is illustrated in FIG. 22, a processor may alternatively include more than one of the processor core 2200 illustrated in FIG. 22. For example, processor core 2200 represents one example embodiment of processors cores 2074*a*, 2074*b*, 2084*a*, and 2084*b* shown and described with reference to processors 2070 and 2080 of FIG. 20. Processor core 2200 may be a single-threaded core or, for at least one embodiment, processor core 2200 may be multi-threaded in that it may include more than one hardware thread context (or "logical processor") per core.

FIG. 22 also illustrates a memory 2202 coupled to processor core 2200 in accordance with an embodiment. Memory 2202 may be any of a wide variety of memories (including various layers of memory hierarchy) as are known or otherwise available to those of skill in the art. Memory 2202 may include code 2204, which may be one or more instructions, to be executed by processor core 2200. Processor core 2200 can follow a program sequence of instructions indicated by code 2204. Each instruction enters a front-end logic 2206 and is processed by one or more decoders 2208. The decoder may generate, as its output, a micro operation such as a fixed width micro operation in a predefined format, or may generate other instructions, microinstructions, or control signals that reflect the original code instruction. Front-end logic 2206 also includes register renaming logic 2210 and scheduling logic 2212, which generally allocate resources and queue the operation corresponding to the instruction for execution.

Processor core 2200 can also include execution logic 2214 having a set of execution units 2216-1 through 2216-N. Some embodiments may include a number of execution units dedicated to specific functions or sets of functions. Other embodiments may include only one execution unit or one execution unit that can perform a particular function. Execution logic 2214 performs the operations specified by code instructions.

After completion of execution of the operations specified by the code instructions, back-end logic 2218 can retire the instructions of code 2204. In one embodiment, processor core 2200 allows out of order execution but requires in order retirement of instructions. Retirement logic 2220 may take a variety of known forms (e.g., re-order buffers or the like). In this manner, processor core 2200 is transformed during execution of code 2204, at least in terms of the output generated by the decoder, hardware registers and tables utilized by register renaming logic 2210, and any registers (not shown) modified by execution logic 2214.

Although not illustrated in FIG. 22, a processor may include other elements on a chip with processor core 2200, at least some of which were shown and described herein with reference to FIG. 20. For example, as shown in FIG. 20, a processor may include memory control logic along with processor core 2200. The processor may include I/O control logic and/or may include I/O control logic integrated with memory control logic. Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although the present disclosure has been illustrated with reference to particular elements and operations that facilitate the communication process, these elements and operations may be replaced by any suitable architecture, protocols, and/or processes that achieve the intended functionality of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example A1 is an electronic system that includes a docking station configured to wirelessly couple to an electronic device and a wireless charging element removably coupled to the docking station. The wireless charging element can include a power receiving unit and can be configured to wireless charge the electronic device.

In Example A2, the subject matter of Example A1 may optionally include where the docking station is configured for high speed input/output.

In Example A3, the subject matter of any of the preceding 'A' Examples can optionally include where the docking station includes connections for a plurality of peripherals to enable high speed communications with the plurality of peripherals.

In Example A4, the subject matter of any of the preceding 'A' Examples can optionally include where the docking station includes a control module to control the wireless charging element.

In Example A5, the subject matter of any of the preceding 'A' Examples can optionally include where the wireless charging element can couple to the docking station in a vertical configuration and a horizontal configuration.

In Example A6, the subject matter of any of the preceding 'A' Examples can optionally include where the wireless charging element includes a device support to support the electronic device when the wireless charging element is coupled to the docking station in the vertical configuration.

In Example A7, the subject matter of any of the preceding 'A' Examples can optionally include where the docking station includes support arms to support the docking station and wireless charging element in the vertical configuration.

Example AA1 is a docking station that includes a wireless module to wirelessly couple the docking station to an electronic device and a wireless charging element removably coupled to the docking station. The wireless charging element can include a power receiving unit and can be configured to wireless charge the electronic device.

In Example AA2, the subject matter of Example AA1 may optionally include where the docking station is configured for high speed input/output.

In Example AA3, the subject matter of any of the preceding 'AA' Examples can optionally include a plurality of peripheral connections to enable high speed input/output communications with a plurality of peripherals.

In Example AA4, the subject matter of any of the preceding 'AA' Examples can optionally include a control module to control the wireless charging element.

In Example AA5, the subject matter of any of the preceding 'AA' Examples can optionally include where the wireless charging element can couple to the docking station in a vertical configuration and a horizontal configuration.

In Example AA6, the subject matter of any of the preceding 'AA' Examples can optionally include support arms to support the docking station and wireless charging element in the vertical configuration.

Example M1 is a method that includes coupling a docking station to a wireless charging element, wirelessly coupling the docking station to an electronic device, and wirelessly coupling the wireless charging element to the electronic device.

In Example M2, the subject matter of any of the preceding 'M' Examples can optionally include where the docking station is configured for high speed input/output.

In Example M3, the subject matter of any of the preceding 'M' Examples can optionally include where the docking station includes connections for a plurality of peripherals to enable high speed communications with the plurality of peripherals.

In Example M4, the subject matter of any of the preceding 'M' Examples can optionally include where the docking station includes a control module to control the wireless charging element.

In Example M5, the subject matter of any of the preceding 'M' Examples can optionally include where the wireless charging element can couple to the docking station in a vertical configuration and a horizontal configuration.

In Example M6, the subject matter of any of the preceding 'M' Examples can optionally include where the wireless charging element includes a device support to support the electronic device when the wireless charging element is coupled to the docking station in the vertical configuration.

In Example M7, the subject matter of any of the preceding 'M' Examples can optionally include where the docking station includes support arms to support the docking station and wireless charging element in the vertical configuration.

The invention claimed is:

1. An electronic system, comprising:
   a docking station, wherein the docking station is configured to wirelessly couple to an electronic device, wherein the docking station is configured for wireless gigabyte communications and for high speed input/output; and
   a wireless charging element removably coupled to the docking station, wherein the wireless charging element includes a power receiving unit and is configured to wireless charge the electronic device, wherein the wireless charging element is configured to couple to the docking station in both a vertical configuration and a horizontal configuration.

2. The electronic device of claim 1, wherein the docking station includes connections for a plurality of peripherals to enable high speed communications with the plurality of peripherals.

3. The electronic device of claim 1, wherein the docking station includes a control module to control the wireless charging element.

4. The electronic device of claim 1, wherein the wireless charging element includes a device support to support the electronic device when the wireless charging element is coupled to the docking station in the vertical configuration.

5. The electronic device of claim 1, wherein the docking station includes support arms to support the docking station and wireless charging element in the vertical configuration.

6. The electronic device of claim 1, wherein the wireless gigabyte communications are in a sixty gigahertz band.

7. A docking station comprising:
   a wireless module to wirelessly couple the docking station to an electronic device, wherein the docking station is configured for wireless gigabyte communications in a sixty gigahertz band and for high speed input/output; and
   a wireless charging element removably coupled to the docking station, wherein the wireless charging element includes a power receiving unit and is configured to wireless charge the electronic device.

8. The docking station of claim 7, further comprising:
   a plurality of peripheral connections to enable high speed input/output communications with a plurality of peripherals.

9. The docking station of claim 7, further comprising:
   a control module to control the wireless charging element.

10. The docking station of claim 7, wherein the wireless charging element can couple to the docking station in a vertical configuration and a horizontal configuration.

11. The docking station of claim 10, further comprising:
    support arms to support the docking station and wireless charging element in the vertical configuration.

12. A method, comprising:
    coupling a docking station to a wireless charging element;
    wirelessly coupling the docking station to an electronic device, wherein the docking station is configured for wireless gigabyte communications and for high speed input/output; and
    wirelessly coupling the wireless charging element to the electronic device.

13. The method of claim 12, wherein the docking station includes connections for a plurality of peripherals to enable high speed communications with the plurality of peripherals.

14. The method of claim 12, wherein the docking station includes a control module to control the wireless charging element.

15. The method of claim 12, wherein the wireless charging element can couple to the docking station in a vertical configuration and a horizontal configuration.

16. The method of claim 15, wherein the wireless charging element includes a device support to support the electronic device when the wireless charging element is coupled to the docking station in the vertical configuration.

17. The method of claim 15, wherein the docking station includes support arms to support the docking station and wireless charging element in the vertical configuration.

* * * * *